United States Patent [19]

Yamamoto

[11] Patent Number: 5,745,031
[45] Date of Patent: Apr. 28, 1998

[54] SAFETY DRIVING SYSTEM

[75] Inventor: Keiichi Yamamoto, Yokohama, Japan

[73] Assignee: Mitsubishi Jidosha Kogyo Kabushiki Kaisha, Tokyo, Japan

[21] Appl. No.: 507,481

[22] PCT Filed: Dec. 28, 1994

[86] PCT No.: PCT/JP94/02292

§ 371 Date: Aug. 28, 1995

§ 102(e) Date: Aug. 28, 1995

[87] PCT Pub. No.: WO95/18433

PCT Pub. Date: Jul. 6, 1995

[30] Foreign Application Priority Data

Dec. 28, 1993 [JP] Japan ............................. 5-337407

[51] Int. Cl.$^6$ .............................................. B60Q 1/00
[52] U.S. Cl. .................... 340/439; 340/575; 340/576
[58] Field of Search .......................... 340/439, 575, 340/576

[56] References Cited

U.S. PATENT DOCUMENTS

| | | | |
|---|---|---|---|
| 4,463,347 | 7/1984 | Seko et al. | 340/576 |
| 4,509,040 | 4/1985 | Seko et al. | 340/576 |
| 4,594,583 | 6/1986 | Seko et al. | 340/576 |
| 4,602,247 | 7/1986 | Seko et al. | 340/575 |
| 4,604,611 | 8/1986 | Seko et al. | 340/576 |
| 4,794,536 | 12/1988 | Eto et al. | 340/576 |
| 5,122,957 | 6/1992 | Hattori | 364/424.02 |

FOREIGN PATENT DOCUMENTS

| | | |
|---|---|---|
| 58-105844 | 6/1983 | Japan. |
| 58-175094 | 10/1983 | Japan. |
| 3-219400 | 9/1991 | Japan. |
| 3-273498 | 12/1991 | Japan. |
| 554300 | 3/1993 | Japan. |
| 566803 | 3/1993 | Japan. |

*Primary Examiner*—Jeffery Hofsass
*Assistant Examiner*—Davetta Woods

[57] ABSTRACT

A safety driving system detects a driver's alertness, thereby emitting an alarm depending on the detected alertness. The safety driving system comprises an operation detecting section A, which updates monotonousness T each time one of the driver-operated device is operated, and subtracts a weight ni, assigned to the operated device, from a value denoting the monotonousness, a steering detecting section (C) for deriving a steering amount (e.g. SQ), a running position detecting section (A) for detecting a zigzag amount (Rn) denoting a deviation of white lines detected based on an image of a road surface, a fuzzy inference section D inferring driver's alertness using membership functions of the sections (A), (B) and (C), and an alerting section F for emitting an alarm in accordance with the detected driver's alertness. The zigzag amount (Rn) may be determined on the basis of images which are taken by a camera 2 and which indicate white lines on the road surface so as to reliably determine the driver's alertness.

8 Claims, 31 Drawing Sheets

FIG. 20

FUZZY RULE

| MONOTO-NOUSNESS / STEERING AMOUNT / ZIGZAG AMOUNT | HIGH | | | MEDIUM | | | LOW | | |
|---|---|---|---|---|---|---|---|---|---|
| | SMALL | MEDIUM | LARGE | SMALL | MEDIUM | LARGE | SMALL | MEDIUM | LARGE |
| LARGE | 5.0 | 4.5 | 4.0 | 4.5 | 4.0 | 3.5 | 4.0 | 3.5 | 3.0 |
| MEDIUM | 4.0 | 3.0 | 2.5 | 3.5 | 3.0 | 2.5 | 3.0 | 2.5 | 2.0 |
| SMALL | 3.0 | 2.0 | 1.5 | 2.5 | 2.0 | 1.5 | 2.0 | 1.5 | 1.0 |

FIG. 21

| | MONOTO-NOUSNESS | 0 | | 0.24 | | 0.76 | | 0.24 | |
|---|---|---|---|---|---|---|---|---|---|
| ZIGZAG AMOUNT | STEERING AMOUNT | | 0.14 | 0.86 | | 0.14 | 0.86 | | 0.14 | 0.86 |
| 0.05 | | O | O | O | O | O | 0.05 | O | 0.05 |
| 0.95 | | O | O | O | 0.05 | 0.14 | 0.76 | 0.05 | 0.24 |
| O | | O | O | O | O | O | O | O | O |

FIG. 31

FUZZY RULE

| ALERTNESS | | STEERING SPEED → LOW | LOW | LOW | MEDIUM | MEDIUM | MEDIUM | HIGH | HIGH | HIGH |
|---|---|---|---|---|---|---|---|---|---|---|
| | | NUMBER OF STEERING OPERATIONS → SMALL | MEDIUM | LARGE | SMALL | MEDIUM | LARGE | SMALL | MEDIUM | LARGE |
| HIGH | LARGE | 5 | 4.5 | 4 | 4 | 3.5 | 3.5 | 4.5 | 3.5 | 3.5 |
| HIGH | MEDIUM | 4.5 | 4 | 3.5 | 3.5 | 3 | 3 | 3 | 3 | 3 |
| HIGH | SMALL | 4 | 3.5 | 3 | 3 | 2.5 | 2.5 | 2.5 | 2.5 | 2.5 |
| MEDIUM | LARGE | 4 | 3 | 3 | 3 | 3 | 2.5 | 2 | 2 | 2 |
| MEDIUM | MEDIUM | 3.5 | 2.5 | 2.5 | 2.5 | 2.5 | 2 | 2 | 2 | 2 |
| MEDIUM | SMALL | 3 | 2.5 | 2 | 2 | 2 | 2 | 1.5 | 1.5 | 1.5 |
| LOW | LARGE | 3 | 2 | 2 | 2 | 2 | 2 | 1.5 | 1.5 | 1.5 |
| LOW | MEDIUM | 2.5 | 2 | 1.5 | 1.5 | 1.5 | 1.5 | 1 | 1 | 1.5 |
| LOW | SMALL | 2 | 1.5 | 1.5 | 1 | 1 | 1 | 1 | 1 | 1 |

↑ ZIGZAG AMOUNT

↑ MONOTONOUSNESS (AWAKE) ALERTNESS X → (SLEEPY)

NON-OPERATION PERIOD (SECOND)

FIG. 39

FUZZY RULE

| STEERING AMOUNT \ MONOTO-NOUSNESS | HIGH | MEDIUM | LOW |
|---|---|---|---|
| SMALL | 5.0 | 4.5 | 4.0 |
| MEDIUM | 3.5 | 3.0 | 2.5 |
| LARGE | 2.0 | 1.5 | 1.0 |

FIG. 40

| STEERING AMOUNT \ MONOTO-NOUSNESS | 0 | 0.76 | 0.24 |
|---|---|---|---|
| 0 | 0 | 0 | 0 |
| 0.14 | 0 | 0.14 | 0.14 |
| 0.86 | 0 | 0.76 | 0.24 |

# SAFETY DRIVING SYSTEM

FIELD OF THE INVENTION

This invention relates to a safety driving system for use with a motor vehicle, and more particularly to a safety driving system which alerts a driver who is likely to be driving while half asleep.

DESCRIPTION OF THE RELATED ART

A motor vehicle has a number of devices which are operated by the driver, e.g. a steering wheel, an accelerator pedal, a brake pedal, a gear lever, a winker lever, a wiper switch, lamp switches and so on.

The less frequently those driver-operated devices are required to be operated, the more driving will become monotonous, and the more the driver will feel fatigued and sleepy. In such a state, there is a high probability that the driver is likely to fall into a semi-sleep while driving.

Japanese Patent Laid-Open Publication No. Sho 58-105, 844 discloses a safety driving system in which an alarm is emitted when a predetermined period of time lapses before the driver manipulates at least one of the driver-operated devices.

Further, Japanese Patent Laid-Open Publication No. Sho 58-175,094 proposes a safety driving system which emits an alarm in the following case. Each time a predetermined period of time passes before the driver operates at least one of the driver-operated devices a preset number of times, digital data "1" is accumulated in a counter. Then, when the accumulated value exceeds a preset value, an alarm will be emitted to alert the driver.

It has been ascertained that a degree of zigzag running (called "zigzag amount" hereinafter) of a vehicle depends upon a driver's alertness. FIG. 42 of the accompanying drawings shows one example of data of which the inventors are aware.

Detection of the zigzag amount of the vehicle is disclosed in Japanese Patent Laid-Open Publication No. Sho 3-273, 498. In this publication, a video camera takes pictures of a road surface in front of the vehicle. A reference point of a lane is calculated on the basis of a cross point of white lines defining the lane. When the cross point of the white lines deviates from the reference point, it is checked whether the deviation corresponds to a turning signal. If not, an alarm will be emitted.

In the former two publications, the driver's level of activity is periodically sampled and checked on the basis of the frequency of operation of driver-operated devices. It is difficult to precisely ascertain the driver's alertness, which is continuously changing.

In the third example, an alarm is emitted when the deviation of the vehicle from the reference point does not precisely correspond to a turning signal. However, it does not always follow that mismatching between the deviation from the reference point and the turn signal precisely corresponds to the alertness of the driver. It is required to precisely detect the foregoing correspondence between the zigzag running of the vehicle and the alertness of the driver.

The present invention is intended to provide a safety driving system which correctly and continuously detects varying alertness of the driver after he or she starts driving, and alerts the driver, if necessary.

A further object of the invention is to provide a safety driving system which correctly detects alertness of the driver through recognition of white lines on a road surface, and alerts the driver, if necessary.

SUMMARY OF THE INVENTION

According to a first aspect of the invention, there is provided a safety driving system comprising: an operation detecting section including an accumulator for periodically accumulating a constant during operation of a vehicle and deriving monotonousness, and subtracting means for subtracting a weight assigned to an operated device, except for a steering wheel, from a sum of accumulated constants and updating the monotonousness; a steering operation detecting section detecting an amount of steering operation within a preset period of time; a running position detecting section including an image data memory selectively receiving and storing photographed images of a road surface in front of a vehicle, image processing means extracting data on white lines defining a lane on the road surface and determining coordinates of the white lines, and a zigzag amount calculating section detecting a zigzag amount which is a deviation of the white lines on horizontal coordinates; a fuzzy inference section inferring a driver's alertness using membership functions of the operation detecting section and the steering detecting section; and an alerting section activating wake-up members depending upon the driver's alertness.

The steering detecting section detects steering amounts of the steering wheel as the status data on the steering wheel within the preset period of time.

The steering detecting section includes at least either a steering speed sensor for calculating an average steering speed as the data on the steering wheel within the preset period of time, or a steering sensor detecting the number of steering operations within the preset period of time.

The zigzag amount calculating section nullifies zigzag amounts collected while a winker signal is present. This enables the driver's alertness to be detected precisely.

The fuzzy inference section infers the driver's alertness using an average zigzag amount during an initial period immediately after actuation of the vehicle as a reference value of the membership function for the running position detecting section.

In the foregoing arrangement of the invention, the operation detecting section periodically sums a constant so as to derive monotonousness. Each time one of the driver-operated devices other than a steering wheel is operated, a weight assigned to the operated device is subtracted from the sum of the constants, thereby updating the monotonousness. The steering detecting section calculates a steering amount in the preset time period. In the running position detecting section, the image data memory receives images of a road surface in front of a vehicle which are taken by a camera, the image processor determines coordinates of white lines in the images, the zigzag amount calculating section detects a zigzag amount, i.e. deviation of the white lines on horizontal coordinates, and the fuzzy inference section transforms current monotonousness, steering amount and zigzag amount using membership functions associated therewith. Then, the fuzzy inference section infers a driver's alertness. The wake-up section actuates wake-up members depending upon the driver's alertness so as to alert the driver. Thus, the safety driving system can precisely detect the driver's alertness, and alerts the driver, thereby assuring safe driving.

The steering detecting section collects data on a steering amount within a preset time period, which simplifies a control procedure.

The steering detecting section includes at least either a steering speed sensor or a steering operation sensor so as to perform the control procedure reliably.

The zigzag amount calculating section nullifies zigzag amounts collected while a winker signal is present. This enables the driver's alertness to be detected precisely without disturbances which affect the zigzag amount.

The fuzzy inference section infers a driver's alertness using an average zigzag amount during an initial period immediately after actuation of the vehicle as a reference value of the membership function for the running position detecting section.

According to a second aspect of the invention, there is provided a safety driving system comprising: an operation detecting section including accumulating means for periodically accumulating a constant during operation of a vehicle and deriving the monotonousness and subtracting means for subtracting a weight assigned to an operated device, other than a steering wheel, from a sum of accumulated constants and updating the monotonousness; a steering operation detecting section detecting an amount of steering operation within a preset period of time; a fuzzy inference section inferring a driver's alertness using membership functions of the operation detecting section and the steering detecting section; and an alerting section activating wake-up members depending upon the driver's alertness.

In the second arrangement of the invention, the accumulating means periodically accumulates a constant during operation of a vehicle and derives monotonousness. The subtracting means subtracts a weight assigned to an operated device, other than a steering wheel, from a sum of accumulated constants and updates the monotonousness. The steering detecting section detects an amount of steering operation within the preset period of time. The fuzzy inference section infers a driver's alertness using membership functions of the operation detecting section and the steering operation sensor. The alerting section activates wake-up members depending upon the driver's alertness.

Continuously varying driver's alertness is reliably and precisely detected on the basis of the monotonousness and the steering amount so as to alert the driver depending upon the alertness and assure safe driving. The safety device is simplified and manufactured at a reduced cost.

The alerting section actuates one of wake-up members in accordance with the driver's alertness, which alerts the driver appropriately without applying undue stress to the driver.

BRIEF DESCRIPTION OF THE DRAWINGS

FIG. 20 shows a format of a control rule used for the fuzzy inference of the safety driving system of FIG. 1.

FIG. 21 shows a format of the control rule to which fuzzy conversion grades are applied.

FIG. 31 shows a format of a control rule used for the safety driving system to perform fuzzy inference.

FIG. 39 shows a format of a control rule used for the safety driving system of FIG. 35 to perform fuzzy inference.

FIG. 40 shows a format of the control rule to which fuzzy conversion grades are applied.

DESCRIPTION OF THE PREFERRED EMBODIMENTS

Figure 1:
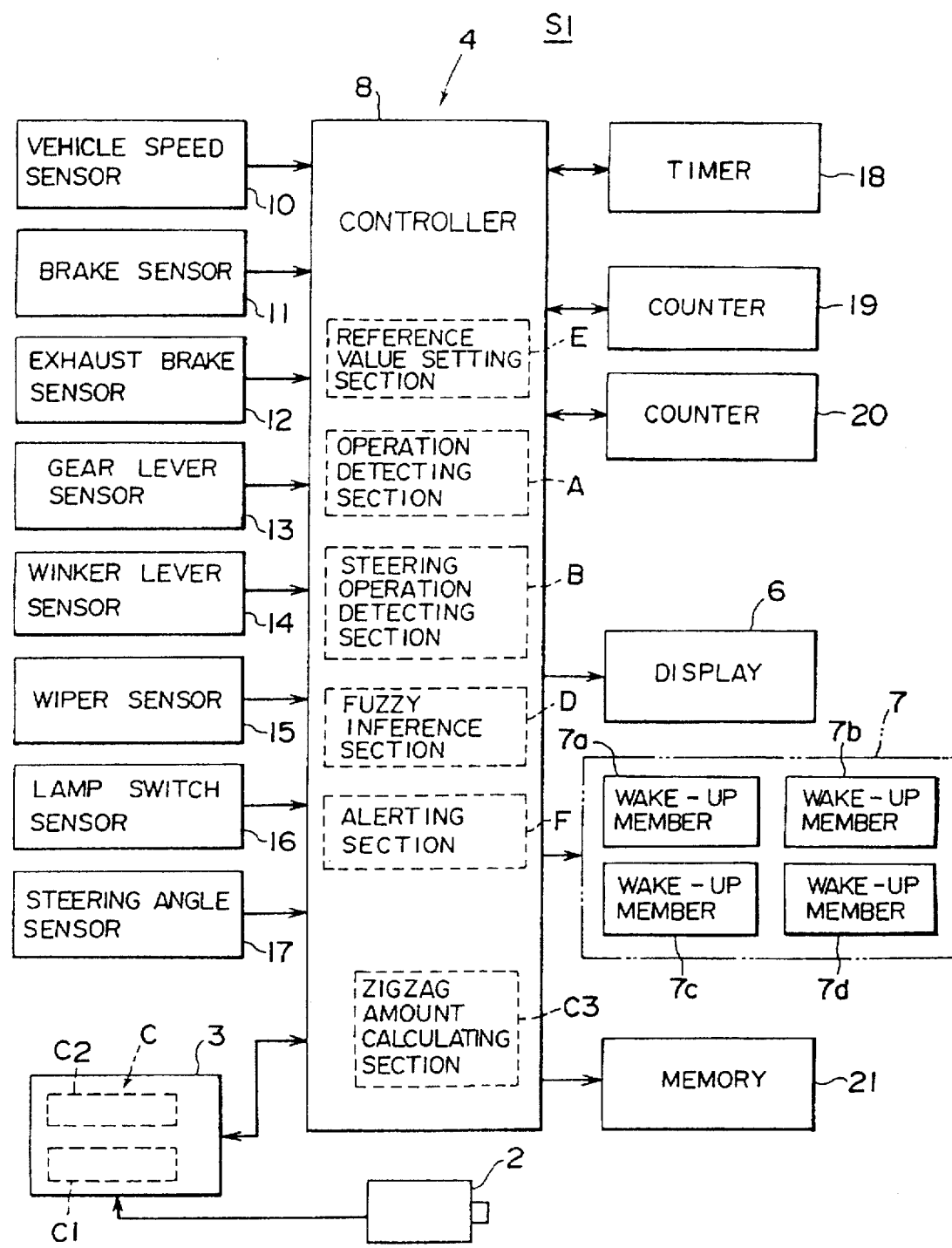
FIG. 1 is a schematic diagram showing the configuration of a safety driving system according to a first embodiment of the invention.

A safety driving system S1 according to a first embodiment of the invention is configured as shown in FIG. 1.

Figure 2:
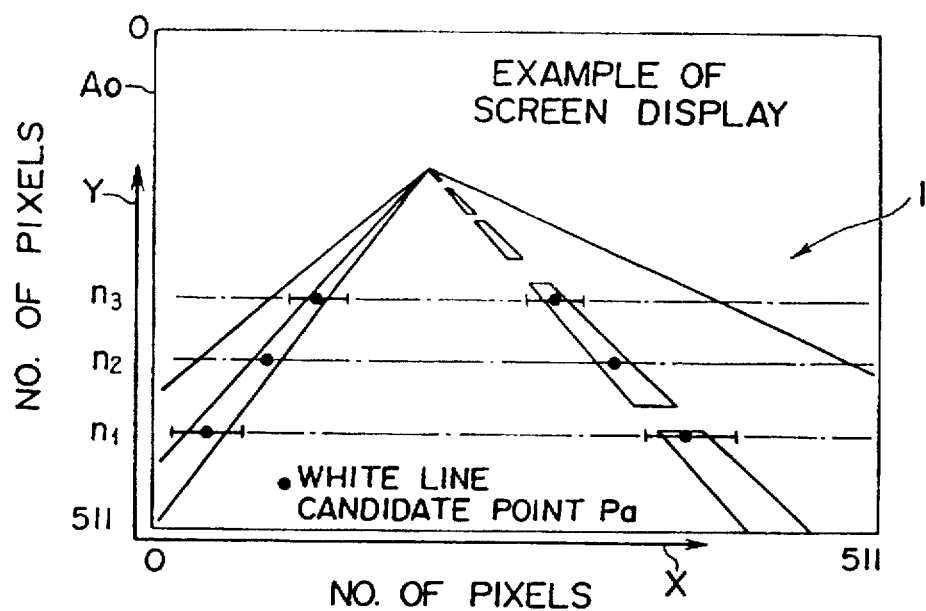
FIG. 2 is an example of a display screen used by a running position sensor of the safety driving system shown in FIG. 1.

The safety driving system S1 comprises a camera 2 (located at a front part of a passenger area, not shown), an image processor 3 connected to the camera 2, a control unit 4, a display 6, and a wake-up unit 7. The camera 2 takes pictures of a road surface in front of the vehicle as shown in FIG. 2. The display 6 and wake-up unit 7 alert the driver.

The control unit 4 is connected to the image processor 3 via a communication line so as to transfer signals therebetween.

The camera 2 takes pictures of the road surface in front of the vehicle. Each picture is displayed on a screen Ao as shown in FIG. 2.

The image processor 3 has well-known image processing functions, and includes an image data memory C1 and an image processing unit C2, both of which serve as a part of a running position detecting section C.

The image data memory C1 periodically and selectively receives still pictures P1 from the camera 2 (FIG. 2 shows one example of such pictures on the display screen Ao), and stores them in its up-dated image area.

Figure 4:
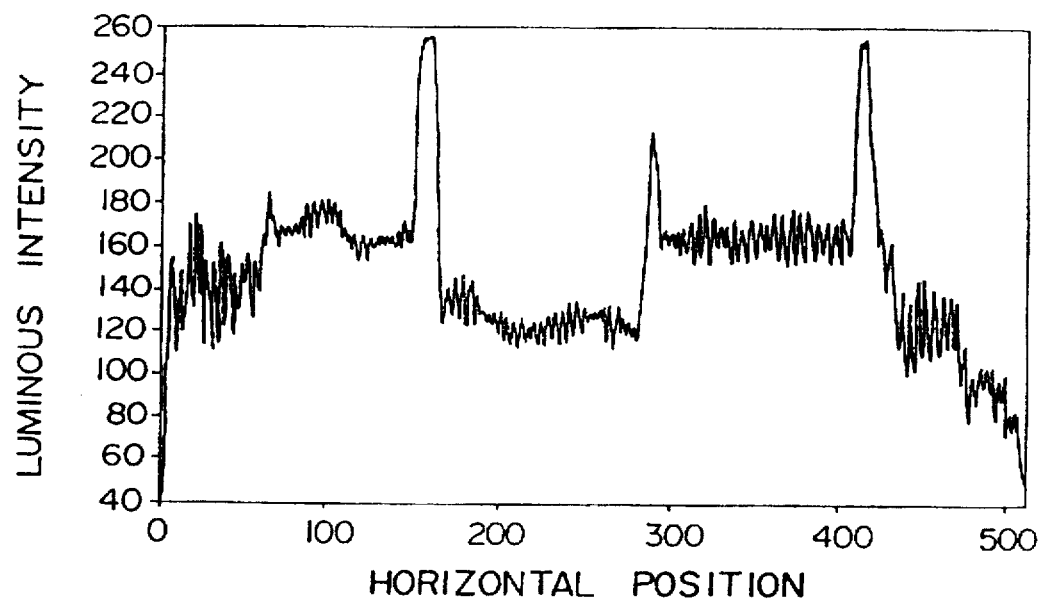
FIG. 4 is a graph showing luminous intensities in an image of a road surface having white lines, which is processed by a running position detecting section of the safety driving system.

The image processing unit C2 sequentially processes images. Specifically, the image processing unit C2 receives data of a latest picture P1 (shown in FIG. 2) from the updated image area. Referring to FIG. 2, on the display screen Ao, lines n1, n2 and n3 (which are set beforehand) extend from a plurality of points on the Y-axis (in the vertical direction) and along the X-axis (in the horizontal direction). A detected signal which is photo-converted for picture elements present along the lines n1, n2 and n3 is subject to analog-to-digital conversion, and is converted to a signal indicative of luminous intensities as shown in FIG. 4. Values representing luminous intensities of the picture elements on the respective lines are differentially filtered one after another in accordance with formula (1).

$$f(i,j)=-1\times f(i-3,j)-1\times f(i-2,j)-1\times f(i-1,j)+0\times f(i,j)+1\times f(i+1,j)+1\times f(i+2,j)+1\times f(i+3,j) \quad (1)$$

Figure 5:
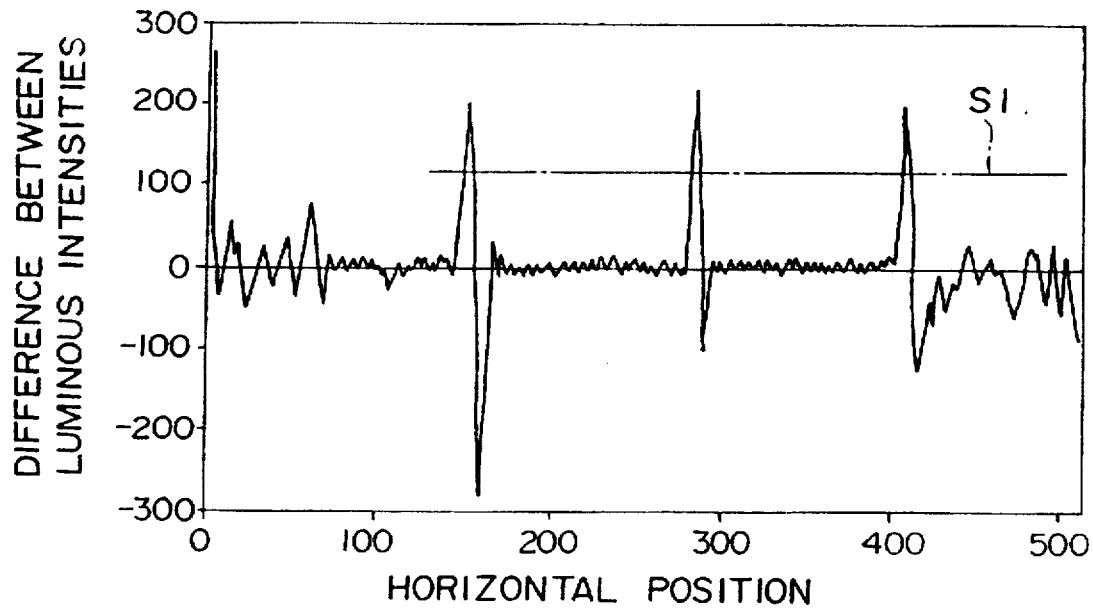
FIG. 5 is a graph showing the luminous intensities of FIG. 4 which are differentially filtered.

The values representing luminous intensities of the picture elements on the lines n1, n2 and n3 are smoothed, and are converted into differences of luminous intensities of adjacent picture element as shown in FIG. 5.

Thereafter, the image processing section C2 searches for candidate points Pa of the white lines by comparing the differences of luminous intensities, of the adjacent picture elements on the lines n1, n2 and n3, with a preset slice level s1.

On the basis of data of the candidate points Pa on the lines n1, n2 and n3, calculation is performed so as to infer the right and left white lines $L_R$ and $L_L$. In this case, the data of the candidate points Pa on the lines n1, n2 and n3 are calculated using the method of least squares so as to derive positions ($Y_R n = aX_R n+b$) and ($Y_L n = cX_L n+d$) of the white lines $L_R$ and $L_L$ on the X and Y coordinates. The derived positions are outputted to the control unit 4.

The control unit 4 includes a controller 8, which has a vehicle speed sensor 10, a brake sensor 11, an exhaust brake sensor 12, a gear lever sensor 13, a winker sensor 14, a wiper sensor 15, a lamp switch sensor 16, and a steering angle sensor 17. These sensors are used to detect the operation of their associated devices.

The vehicle speed sensor 10 detects a vehicle speed V. The brake sensor 11 detects the actuation of a brake pedal. The exhaust brake sensor 12 detects the actuation of an exhaust brake switch. The gear lever sensor 13 detects the actuation of a gear lever of a transmission. The winker sensor 14 detects the actuation of a winker lever. The wiper sensor 15 detects the actuation of a wiper switch. The lamp switch sensor 16 detects the actuation of a lamp switch. The steering angle sensor 17 detects a steering angle Q of a steering wheel.

The controller 8 is also connected to a timer 18, counters 19 and 20, the display 6, the wake-up unit 7, and the memory 21.

The wake-up unit 7 includes four wake-up members 7a, 7b, 7c and 7d.

The wake-up member 7a emits a scent or a breeze, and provides the lowest level wakening effect.

The wake-up member 7b emits light beams or a blast of air, and provides a wakening effect which is higher than that of the wake-up unit 7a.

The wake-up member 7c emits sound or generates vibration, and provides a wakening effect which is higher than that of the wake-up unit 7b.

The wake-up member 7d emits a scent, light beams, a wind or a vibration in combination, or generates an electrical shock, and provides the highest level wakening effect.

The timer 18 measures various periods and control cycles.

The memory 21 stores weights ni (i=1, 2, 3, ...), which are previously assigned to the operation of various driver-operated devices. The memory 21 also stores data concerning various reference values.

The weights ni are determined considering tediousness which is reduced depending upon a kind of operation performed by the driver. For instance, the operation of the winker lever prior to lane changing is assigned "1" as the weight ni. The operation of the brake pedal to stop or slow the vehicle is assigned "2.5" as the weight ni. In other words, one operation of the winker lever is detected as the number of operations "1", while one operation of the brake pedal is detected as the number of operations "2.5".

The remaining operations are assigned weights ni depending upon the extent to which tediousness is relieved.

The control unit 4 is mainly a microcomputer, and functions as a zigzag amount calculator C3, an operation detecting section A, a steering detecting section B, a fuzzy inference section D for inferring the driver's alertness, a reference value setting section E, and an alerting section F.

The zigzag amount calculator C3 constitutes a part of the running position detecting section C, and repeatedly receives, from the image processor, data on the positions ($Y_R n = cX_R n+b$) and ($Y_L n = cX_L n+d$) of the white lines $L_R$ and $L_L$ on the X and Y coordinates. Then, the zigzag amount calculator C3 sequentially calculates X coordinates ($X_{Rn1}$, $X_{Ln1}$), ($X_{Rn2}$, $X_{Ln2}$) and ($X_{Rn3}$, $X_{Ln3}$) of the white lines $L_R$ and $L_L$, and derives deviations of the white lines on the X coordinates, i.e. reference deviations, as a zigzag amount Rn.

Figure 3:
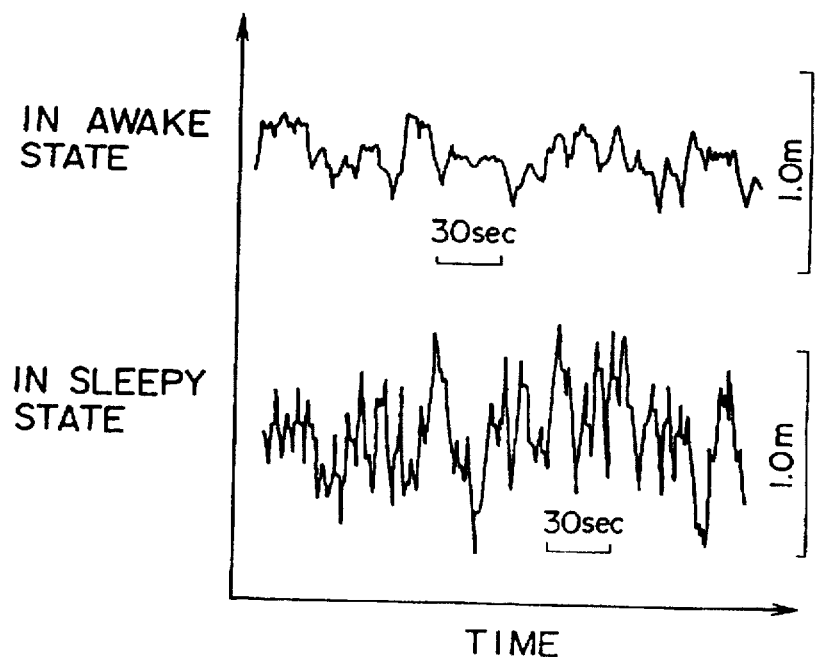
FIG. 3 is a graph showing a zigzag amount of a vehicle while a driver is fully alert and while the driver is sleepy.

Referring to FIG. 3, it can be seen that the zigzag amount Rn when the driver feels sleepy is much larger than the zigzag amount Rn when the driver is alert.

The reference value setting section E remains active for an initial period of a given length $t_{s1}$ after the vehicle is operated. The reference value setting section E performs its operation in the following four steps (1) to (4).

(1) Sets the initial period $t_{s1}$ after the vehicle is started.

(2) Reads a weight ni from the memory 21 each time at least one of the driver-operated devices, other than the steering wheel, is operated by the driver.

(3) Adds the weights ni in the counter 19, and retains a sum n (n=Σni) as the total number No of operations during the initial period. The weights ni are added to cope with simultaneous operation of a plurality of devices, although such a situation is actually rare.

(4) Stores, in the memory 21, the total number No of operations, an average SQm of steering amounts SQ, and an average RNs of zigzag amounts Rn as reference values, after a lapse of the initial period.

The operation detecting section A becomes active after the expiration of the initial period, and functions in the following eight steps (1) to (8).

(1) Makes the timer 18 count a period $t_2$, which lasts after the initial period until the vehicle is stopped, and is called "driving period $t_2$, and an alertness determining period $t_3$ comprising a data collecting period and a data calculating period.

(2) Functions as an accumulation member A1, which lets the counter 19 count a preset constant To every 1/10 seconds so as to determine a monotonousness T.

(3) Reads a weight ni from the memory 21 each time at least one device, other than the steering wheel, is operated by the driver.

(4) Adds the read weights ni in the counter 19, and retains the sum n (n=Σni) as the total number N of operations.

(5) Divides the driving period $t_2$ into the number N of total operations so as to derive an average non-operation period (=$t_2$/N) between operations of various devices.

(6) Multiplies the average non-operation period (=$t_2$/N) and the constant To together and calculates an increase in the monotonousness [=$t_2$/N)·To] between operations of various devices.

(7) Multiplies the reduced monotonousness by the sum n (summed weights ni) so as to derive a reduced degree of monotonousness [=$t_2$/N)·To·n] by a current operation.

(8) Functions as a subtraction member A2 so as to deduct the reduced monotonousness from the counter 19, and updates the monotonousness T.

The steering detecting section B becomes active after the lapse of the initial period, and functions in the following two steps.

(1) Stores steering angle data detected by the steering angle sensor 17.

(2) Derives an operation amount SQ (called "steering amount SQ" hereinafter) of the steering wheel in the data collecting period using formula (2) on the basis of the steering angle data Q collected in a latest unit time (e.g. one minute).

$$SQ = \sum_{i=1}^{n-1} AVS(q_{i+1} - q_i) \quad (2)$$

Figure 8:
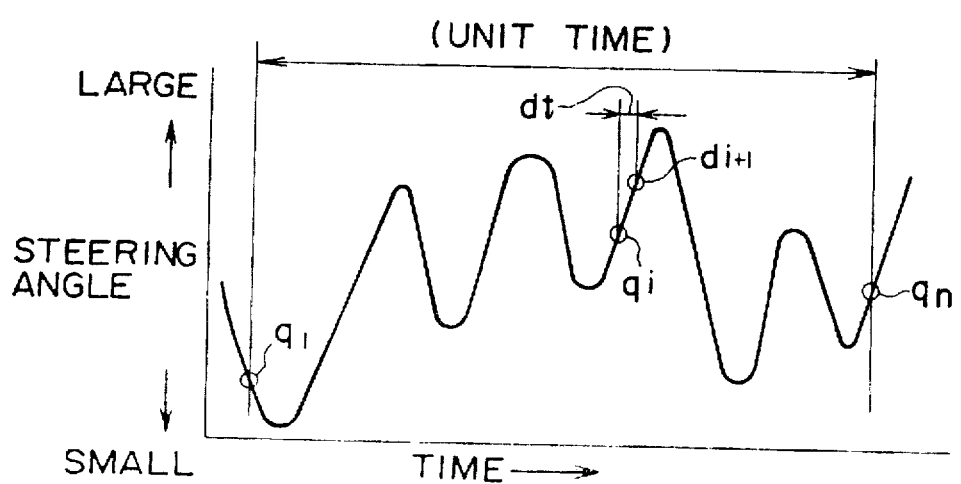
FIG. 8 is a characteristic curve showing a variation of a steering wheel angle with time.
Figure 9:
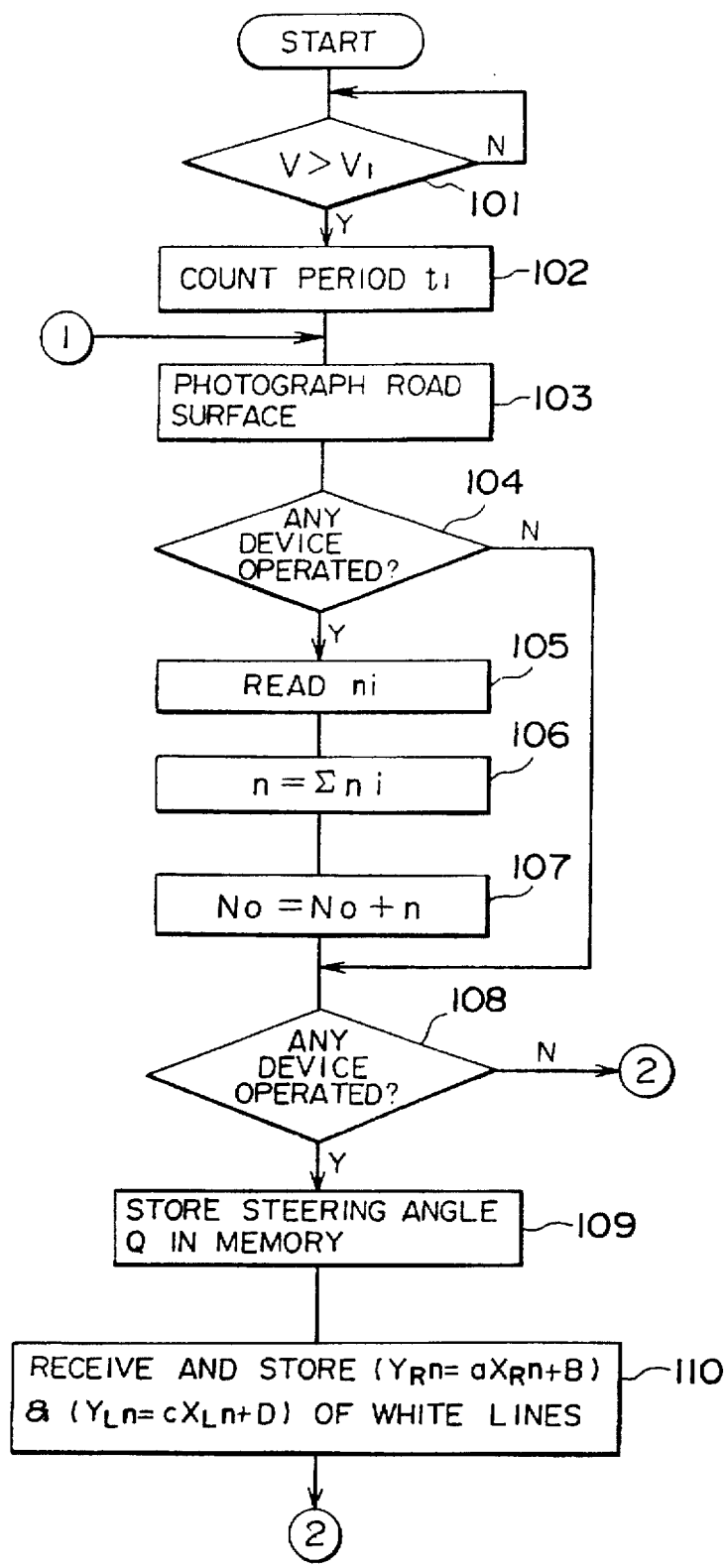
FIG. 9 is a flowchart of a control operation of the safety driving system.

Referring to FIG. 8, at every 1/10 second (dt), i.e. the control cycle, a difference ($q_{i+1}-q_i$) between previous steering angle data $q_i$ and current steering angle data $q_{i+1}$ is calculated. The calculated differences ($q_{i+1}-q_i$) are summed sequentially, so the values added in the unit time ($q_1$ to $q_n$) are calculated as the steering amount SQ.

The fuzzy inference section D becomes active after the lapse of the initial period, and infers the driver's alertness on the basis of the monotonousness T (from the operation detector A), the steering amount SQ (from the steering wheel operation detecting section D), and the zigzag amount Rn (from the running position detecting section C).

The fuzzy inference section D executes alertness determination every minute so as to update the alertness. In this case, data used for each determination cycle are collected for 10 minutes immediately prior to each determination cycle, and are sequentially applied to the fuzzy inference section D with a one-minute delay.

The alerting section F becomes active after the lapse of the initial period, and selectively activates the wake-up member 7a, 7b, 7c or 7d in accordance with the driver's alertness.

The foregoing operation sequence will be described with reference to flowcharts shown in FIGS. 9 to 13 and 22.

When an ignition switch is turned to actuate a vehicle engine, the camera 2, image processor 3 and control unit 4 are activated. The controller 8 monitors a vehicle speed V detected by the vehicle speed sensor 10 (step 101).

The timer 18 starts counting the initial period $t_1$ (seconds) after the vehicle speeds V exceeds a preset value V1 (step 102). Then, a photographing command is issued to the camera 2 and the image processor 3. The image processor 3 processes images, as will be described later.

The preset speed $V_1$ is determined assuming that the vehicle runs on an expressway (high grade road) where the driver is likely to feel fatigued, and is set between 60 Km and 70 Km.

The driver drives the vehicle by operating various devices, e.g. the accelerator pedal, brake pedal, exhaust brake switch, gear lever, winker lever, wiper switch, lamp switch, and steering wheel.

Each time at least one of such devices, other than the steering wheel, is operated, a weight ni, which has been assigned to the operated device, is read from the memory 21 (step 105).

The read weight ni is added to the counter 19 (step 106) as the sum n considering that another device may be simultaneously operated. The sum n is retained as the total number No of operations during the initial period (step 107).

n=Σni

No=No+n

Each time the steering wheel is operated, the steering angle sensor 17 detects a steering angle Q. Thereafter (affirmative in step 108), the steering amount SQ is derived on the basis of the steering angle Q and using formula (2), and is stored in the memory 21 (step 109).

During the initial period $t_1$, the image processor 3 sequentially provides the positions ($Y_Rn=aX_Rn+b$) and ($Y_Ln=cX_Ln+d$) of the white lines $L_R$ and $L_L$ on the X and Y coordinates (step 110), which are sequentially stored in the memory 21.

When the initial period $t_1$ exceeds the preset length $t_{s1}$ (e.g. 20 minutes) (step 111), the initial state is recognized to be completed.

Figure 13:
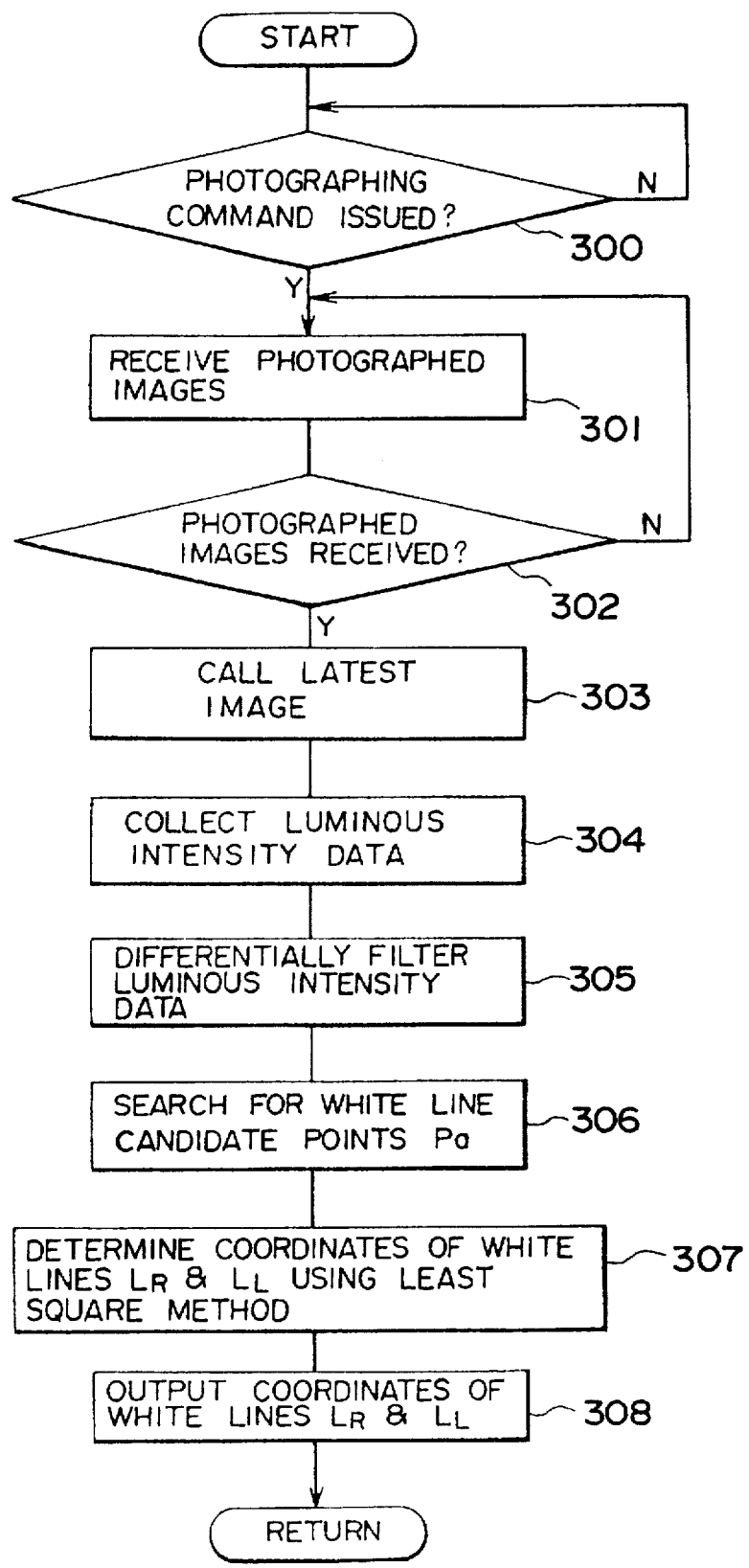
FIG. 13 is a flowchart of another control operation of the safety driving system.

On the other hand, after receiving the photographing command, the image processor 3 starts to infer the white lines in accordance with a sequence shown in FIG. 13 during the initial period.

In step 300, the image processor 3 waits for the photographing command. In response to the photographing command, the image processor 3 receives still images P1 which are periodically taken by the camera 2 and represent road surface data, and stores the data in an updated image data area.

In step 302, the image processor 3 retrieves the data of the latest image P1 from the updated image data area, and obtains data indicative of luminous intensities of all the picture elements present on the lines $n_1$, $n_2$ and $n_3$ in the image P1 (step 303). In steps 304 and 305, the data indicative of the luminous intensities of every two adjacent picture elements are differentially filtered. Differences in the luminous intensities of the picture elements are compared with the slice level s1, thereby searching for candidate points Pa of the white lines.

Data of the candidate points Pa on the lines $n_1$, $n_2$, and $n_3$ crossing the white lines are calculated using the least square method, and used to derive the positions ($Y_R n = a X_R n + b$) and ($Y_L n = c X_L n + d$) of the white lines $L_R$ and $L_L$ on the X and Y coordinates, which will be sent to the controller 8 (step 306).

In step 111 of the main routine, the initial period is considered to be completed. In step 112, the X coordinates ($X_{Rni}$, $X_{Ln1}$), ($X_{Rn2}$, $X_{Ln2}$) and ($X_{Rn3}$, $X_{Ln3}$) of the white lines $L_R$ and $L_L$ are sequentially calculated, a predetermined number of times, on the basis of position data ($Y_R n = a X_R n + b$) and ($Y_L n = c X_L n + d$) of the white lines $L_R$ and $L_L$. Deviations of the white lines in the X direction, i.e. a normal deviation peculiar to the driver during the initial period, are calculated as the initial zigzag amount Rns. Specifically, the initial zigzag amount Rns is calculated on the basis of the driver's data which are collected while the driver is fully alert in the initial period immediately after actuating the vehicle.

In step 113, the steering amount SQ is derived on the basis of the steering angle data Q stored in the memory 21 and by using formula (2). Then, the steering amount SQ is read so as to derive a sum SQm of steering amounts during the initial period (called "initial steering amount SQm" hereinafter).

The total number No of operations indicated by the counter 19, the sum SQm of the steering amounts during the initial period, and the initial zigzag amount Rns are stored in the memory 21 as the reference values (step 114).

During the initial period $t_{s1}$, the driver's personal operation data are collected as described above.

After the expiration of the initial period, the timer 18 starts to count the driving period $t_2$, and the alertness determining period $t_3$ so as to determine the driver's alertness (step 115).

When the vehicle speed V exceeds the predetermined value V1 (affirmative in step 116), it is checked whether or not the winker is active. When the winker is active, the zigzag amount Rn is reset to zero in step 118, and control logic is advanced to step 121.

Figure 6:
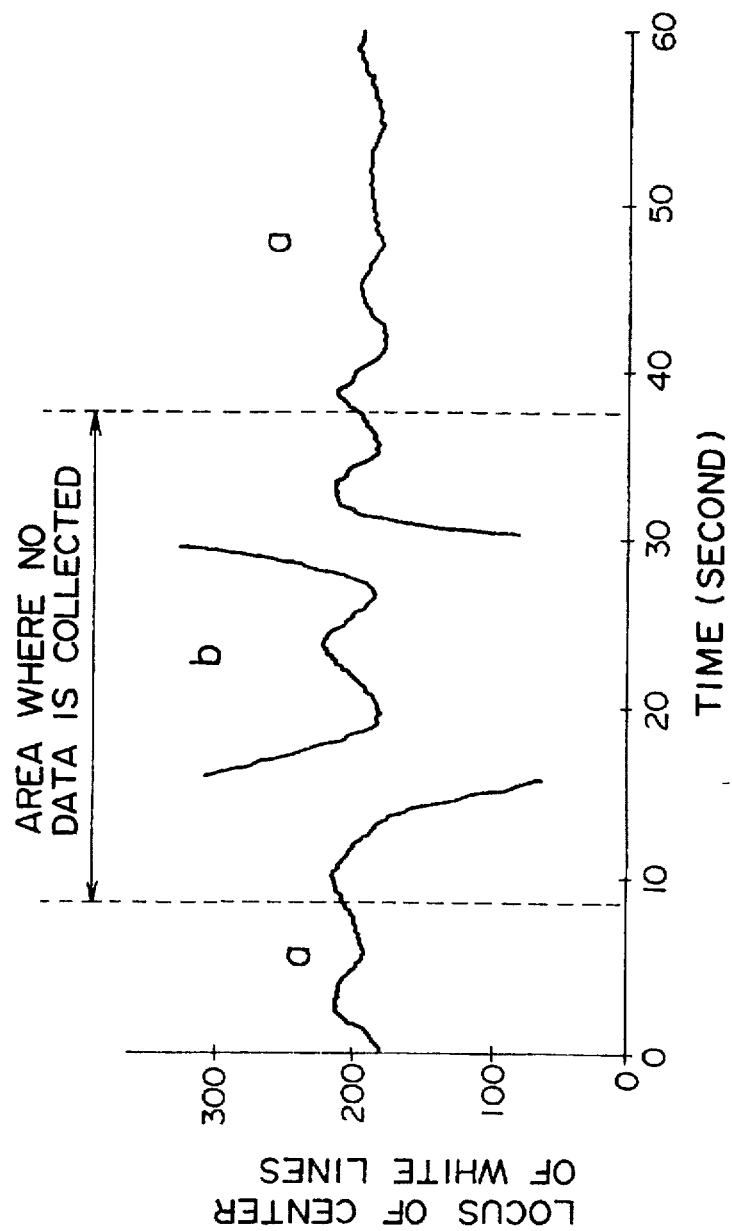
FIG. 6 is a characteristic curve showing a time-dependent variation of a center position between white lines at a time the driver changes lane.
Figure 7:
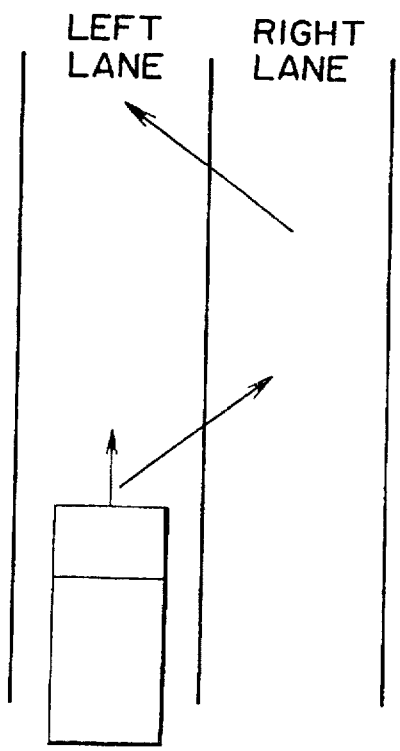
FIG. 7 is a schematic view showing how a vehicle changes lane.

Referring to FIG. 7, if the vehicle is moved to the right lane from the left lane and is returned to the left lane as indicated by the winker, the locus of the center between the white lines ($Y_R n = a X_R n + b$) and ($Y_L n = c X_L n + d$) varies as shown in FIG. 6. In this case, the center moves extensively to a position shown by a line b (corresponding to the right white line of the right lane) from a position shown by line a, and returns to the position shown by the line a. So long as the winker is active, the zigzagging of the vehicle is not considered to be caused by the driver's reduced alertness. In this state, the zigzag amount Rn is reset to zero such that the zigzagging is not associated with the reduced alertness. Thus, driving while half asleep can be reliably detected.

On the other hand, when the winker is found to be inactive in step 117, control logic is advanced to steps 119 and 120.

Data on the latest positions of the white lines ($Y_R n = a X_R n + b$) and ($Y_L n = c X_L n + d$) are received from the image processor 3. A deviation of the X coordinates ($X_{Rn1}$, $X_{Ln1}$), ($X_{Rn2}$, $X_{Ln2}$) and ($X_{Rn3}$, $X_{Ln3}$) of the white lines from the previous X coordinates, i.e. the zigzag amount Rn, is calculated and stored in the memory 21.

In step 121, the steering amount SQ is derived using formula (2) on the basis of the steering angle data Q (the value ($q_{i+1} - q_i$) shown in FIG. 8) detected by the steering angle sensor 17. The data on the steering amount SQ are stored in the memory 21.

The counter 19 accumulates the constant To in its count, thereby deriving updated monotonousness T (step 122).

T=T+To

The constant To is repeatedly accumulated every one tenth of a second, i.e. the control cycle time.

Each time at least one driver-operated device, other than the steering wheel, is operated (affirmative in step 123), the weight ni assigned to the operated device is read from the memory 21, and is accumulated in the count of the counter 19 as the sum n (step 124). Then, the sum n is accumulated in the total number N (step 125).

n=Σni

N=N+n

The driving period $t_2$ is divided by N (the total number of operations), thereby deriving an average non-operation period (=$t_2$/N) of each operation after the initial period.

The average non-operation period is multiplied by the increase of monotonousness (=10·To) and the sum n of the weights. Thus, the monotonousness reduced by the current operation [=($t_2$/N)·10·To·n)] is derived (in step 126).

The monotonousness T is updated by subtracting the reduced monotonousness from the count of the counter 19 (step 126).

$$T=T-[(t_2/N)\cdot 10\cdot To\cdot n]$$

Figure 14:
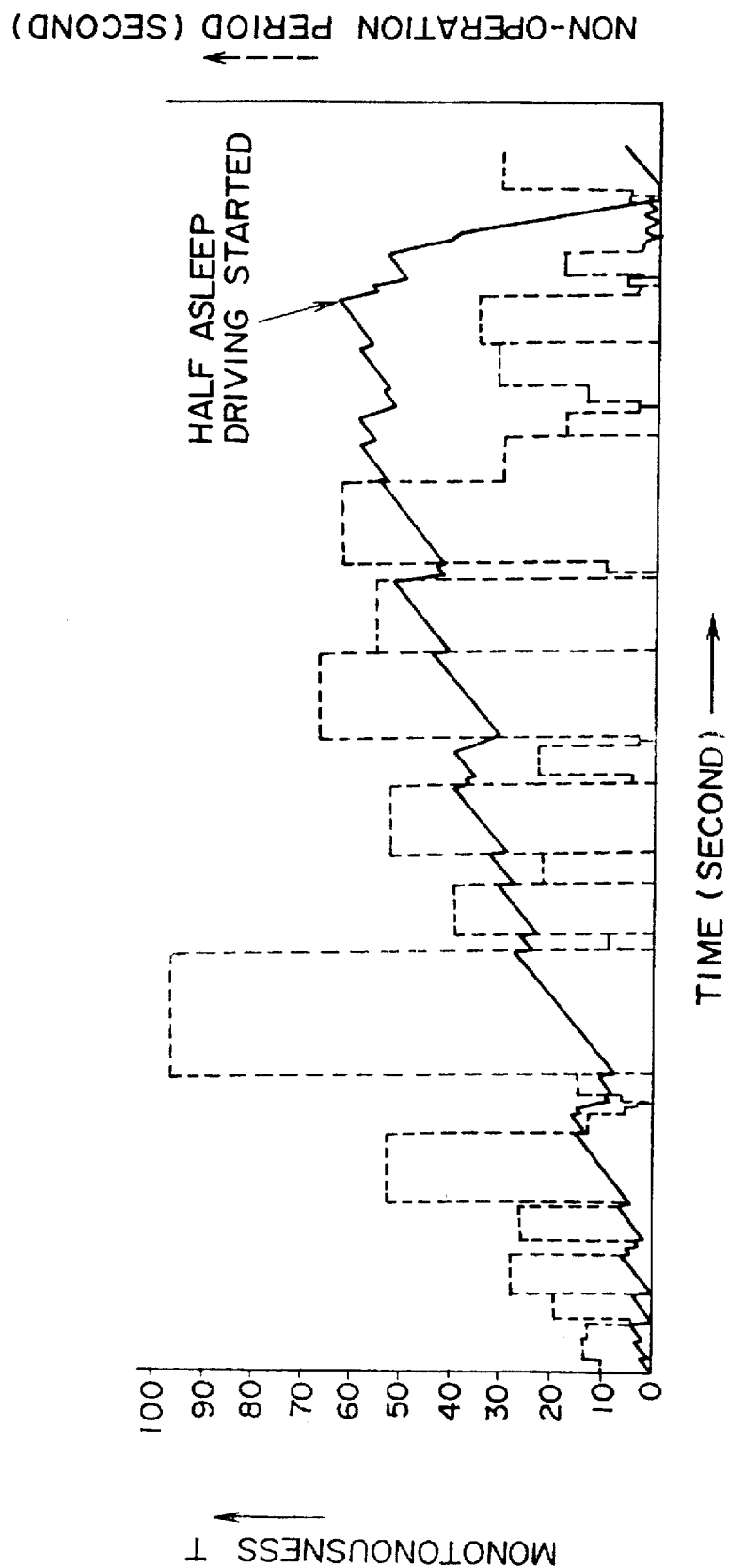
FIG. 14 is a characteristic curve showing a variation of monotonousness with time.

Therefore, the monotonousness T keeps on increasing so long as no device is operated, but is reduced by a weight assigned to an operated device, as can be seen in the experimental data shown in FIG. 14.

When the monotonousness T becomes negative (affirmative in step 127), it is reset to zero (step 128).

The monotonousness T, the steering amount SQ and the zigzag amount Rn are repeatedly calculated and stored until the data collecting period in the alertness determining period $t_3$ expires (step 129).

When the vehicle speed V is reduced below the predetermined value V1 (negative in step 116), the steering amount SQ stored in the memory 21 is cleared (step 130).

The alertness determining period $t_3$ is simultaneously reset to zero (step 131). When the vehicle speed V becomes zero, the alertness display will be turned off as described later (step 133). However, the monotonousness T and the previous X coordinates of the white lines remain indicated.

When the data collecting period expires (affirmative in step 129), the collected data on the zigzag amount Rn, i.e. the deviation of the white lines on the X coordinates ($Y_R n = a X_R n + b$) and ($Y_L n + c X_L n$), are averaged to obtain an average zigzag amount Rn1 (step 134).

Steering angles collected in the data collecting period are summed on the basis of steering angle data which have been already stored. The steering amount SQ (=ΣQn) is stored in the memory 21 (step 135).

In step 136, the alertness X is inferred.

The membership functions for the zigzag amount Rs, monotonousness T, and steering amount SQ are retrieved from the memory 21.

Figure 15:
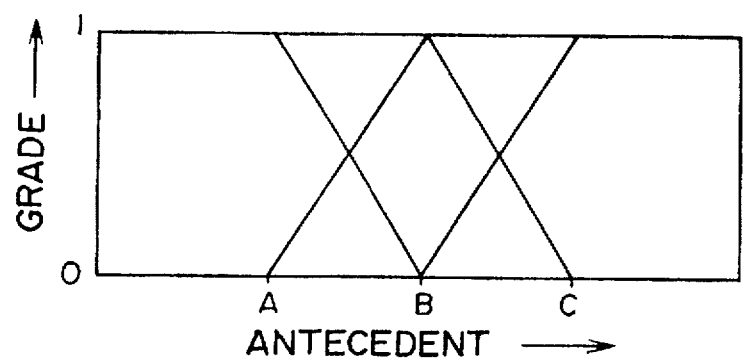
FIG. 15 is a schematic view showing a model of a membership function used for the safety driving system to perform fuzzy inference.

Referring to FIG. 15, each membership function has a triangular shape, and three sections as an antecedent with break points A, B and C.

The membership functions depend upon the reference values obtained during the initial period (i.e. the average zigzag amount Rns, monotonousness T, steering amount SQm, and the total number No of operations) and the total number N of operations performed after the initial period.

The break points A, B and C are determined on the basis of relationships shown in Table 1.

TABLE 1

|  | A | B | C |
|---|---|---|---|
| Monotonousness | C × ⅓ | C × ⅔ | 40, Max. Max value, or a × 12, whichever is the largest |
| Steering amount | Min. value or Max. × 0.6, whichever is the smaller | (A + C)/2 | Max. value |
| Zigzag amount | Rns | A × 1.5 | A × 2 |

(1) The membership function for the monotonousness is divided into three sections "high", "medium" and "low". The break point A is one third (⅓) of the break point C, and the break point B is two thirds (⅔) of the break point C. The break point C is 40, a maximum of the monotonousness, or 12×a (where 12 denotes a constant, and "a" denotes an increase in the monotonousness during a non-operation period), whichever is the largest.

The increase "a" of the monotonousness is derived as follows.

Figure 17:
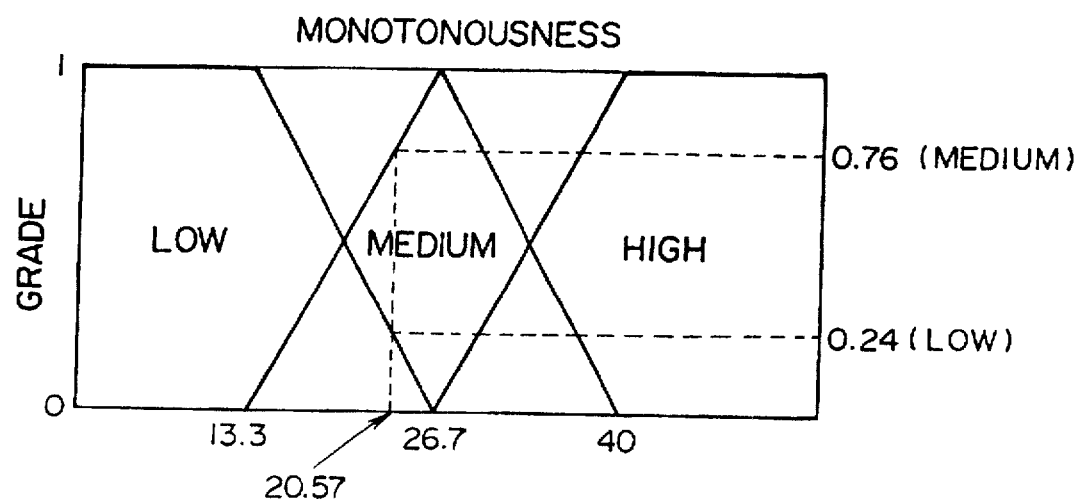
FIG. 17 shows a shape of a membership function with respect to monotonousness.
Figure 18:
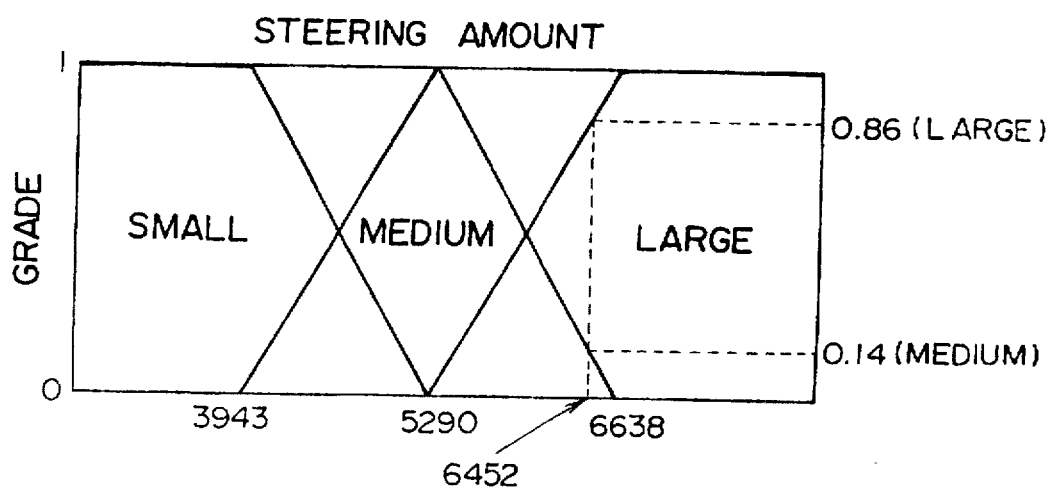
FIG. 18 is shows a shape of a membership function with respect to an amount by which a steering wheel is operated.

The initial period $t_{s1}$ is divided by the total number No of operations, thereby deriving an average non-operation period "b". The average non-operation period "b" is multiplied by the increase of the monotonousness per second (=10·To), thereby deriving the increase "a" of the monotonousness during the non-operation period, as shown in FIG. 17.

b=$t_{s1}$/No a=($t_{s1}$/No)·10·To (2) The membership function for the steering amount is divided into three sections "large", "medium" and "small". The break point A is the smaller of a minimum value of the steering amount SQn per data collecting period (of the alertness determining period $t_3$ or a value which is derived by multiplying the maximum steering amount by 0.6. The break point B is (A+C)/2, and the break point C is the maximum steering amount SQn. Refer to FIG. 18.

Figure 19:
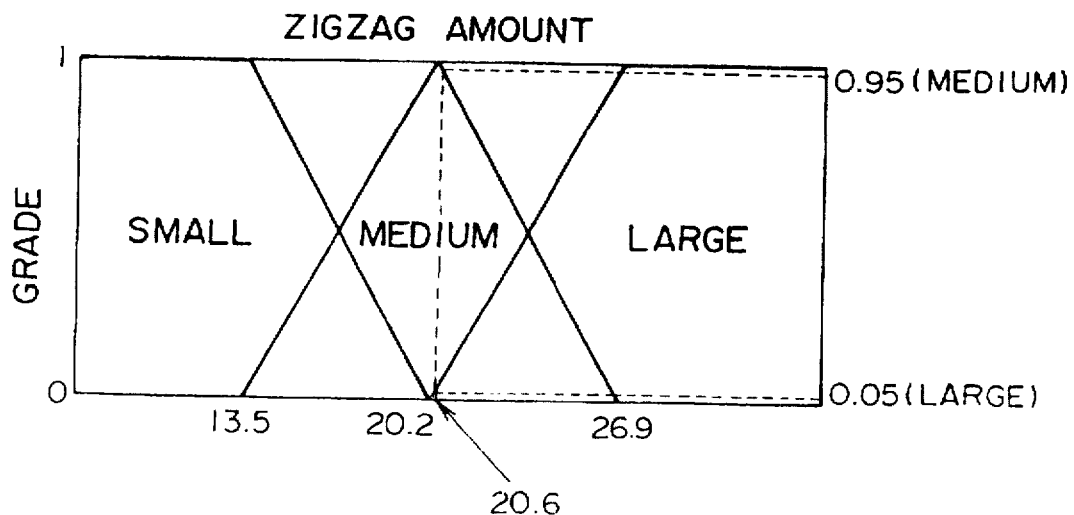
FIG. 19 shows a shape of the membership function with respect to a zigzag amount of the vehicle.

(3) The membership function for the zigzag amount is divided into three sections "large", "medium" and "small". The break point A is the average zigzag amount Rns, the break point B is 1.5A, and the break point C is twice as large as A. Refer to FIG. 19 for actual examples.

The break points of the respective membership functions are determined as reference values to be used for the fuzzy inference as described above. During determination of the alertness, the monotonousness and the steering amount are updated each time their minimum and maximum values vary, while the zigzag amount is not updated once its reference value is determined.

Fuzzy inference is executed using the foregoing membership functions so as to derive the alertness (step 136).

Fuzzy conversion grades of the monotonousness T are calculated using a current monotonousness T (count of the counter 19) and the membership function shown in FIG. 17.

For example, when the current monotonousness T is 20.57 and belongs to the two "intermediate" and "low" sections, two fuzzy conversion grades, 0.76 and 0.24, are derived.

Fuzzy conversion grades of the steering amount are calculated using the steering amount SQn in the data collecting period (derived in step 135), and the membership function shown in FIG. 18.

When the average steering amount is 6452 and belongs to two sections "large" and "medium", for example, two fuzzy conversion grades 0.86 and 0.14 are derived.

Fuzzy conversion grades of the zigzag amount are calculated using the average zigzag amount Rn1 in the data collecting period (derived in step 134) and the membership function shown in FIG. 19.

For instance, when the zigzag amount is 20.6 and belongs to two sections "medium" and "large", two fuzzy conversion grades, 0.95 and 0.05, are derived.

The memory 21 stores a format of a control rule shown in FIG. 20. The alertness is derived by applying the foregoing fuzzy conversion grades to the control rule.

In this case, three fuzzy conversion grades are calculated. The fuzzy conversion grades shown in FIG. 21 are applied to the underlined values shown in FIG. 20.

There are five sections 4, 3.5, 3, 2.5 and 2 where the fuzzy conversion grades are not 0 for the monotonousness, steering amount and zigzag amount.

A maximum fuzzy conversion grade corresponding to the section 4 is 0.05. A maximum value of the fuzzy conversion grades for the section 3.5 is 0.05. A maximum fuzzy conversion grade for the section 3 is 0.14. A maximum fuzzy conversion grade for the section 2.5 is 0.76. Finally, a maximum fuzzy conversion grade for the section 2 is 0.76. These maximum values are derived using the so-called Min and Max composite centroid method.

Figure 16:
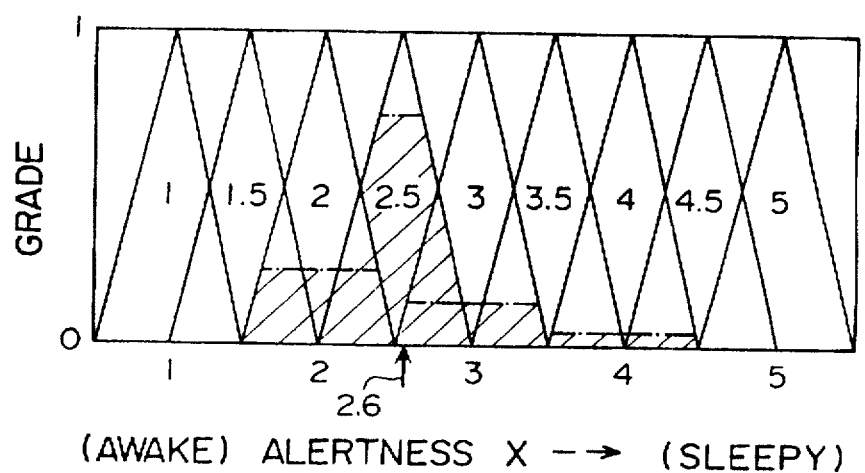
FIG. 16 is a graph showing a shape of a membership function with respect to the driver's alertness.

Referring to FIG. 16, the membership function for the alertness has a triangular shape, and nine sections, and levels of alertness 1 to 5. This membership function is stored in the memory 21.

The foregoing fuzzy conversion grades are applied to the membership function for the alertness as shown by shaded portions in FIG. 16. The center of gravity of the shaded portions is calculated, thereby deriving the alertness X (=2.6). Thus, the fuzzy inference is completed. Thereafter, the alertness X is indicated on the display 6 (step 137). Observing the display 6, the driver can ascertain his or her driving state. Further, a fellow passenger can take appropriate steps, e.g. speaking to the driver so as to alert the driver, thereby preventing the driver from driving while half asleep.

Figure 10:
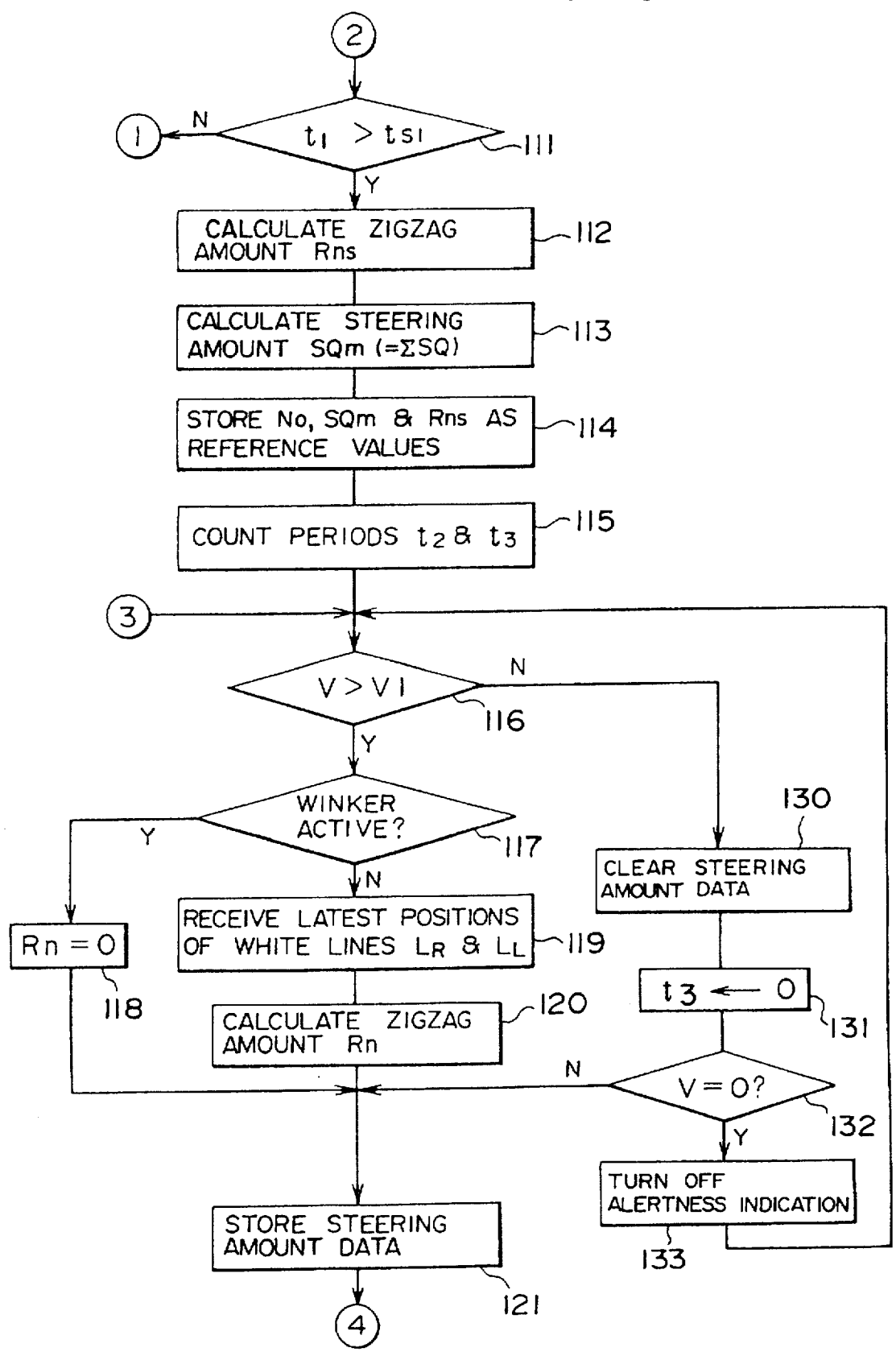
FIG. 10 is a continuation of the flowchart of FIG. 9.
Figure 11:
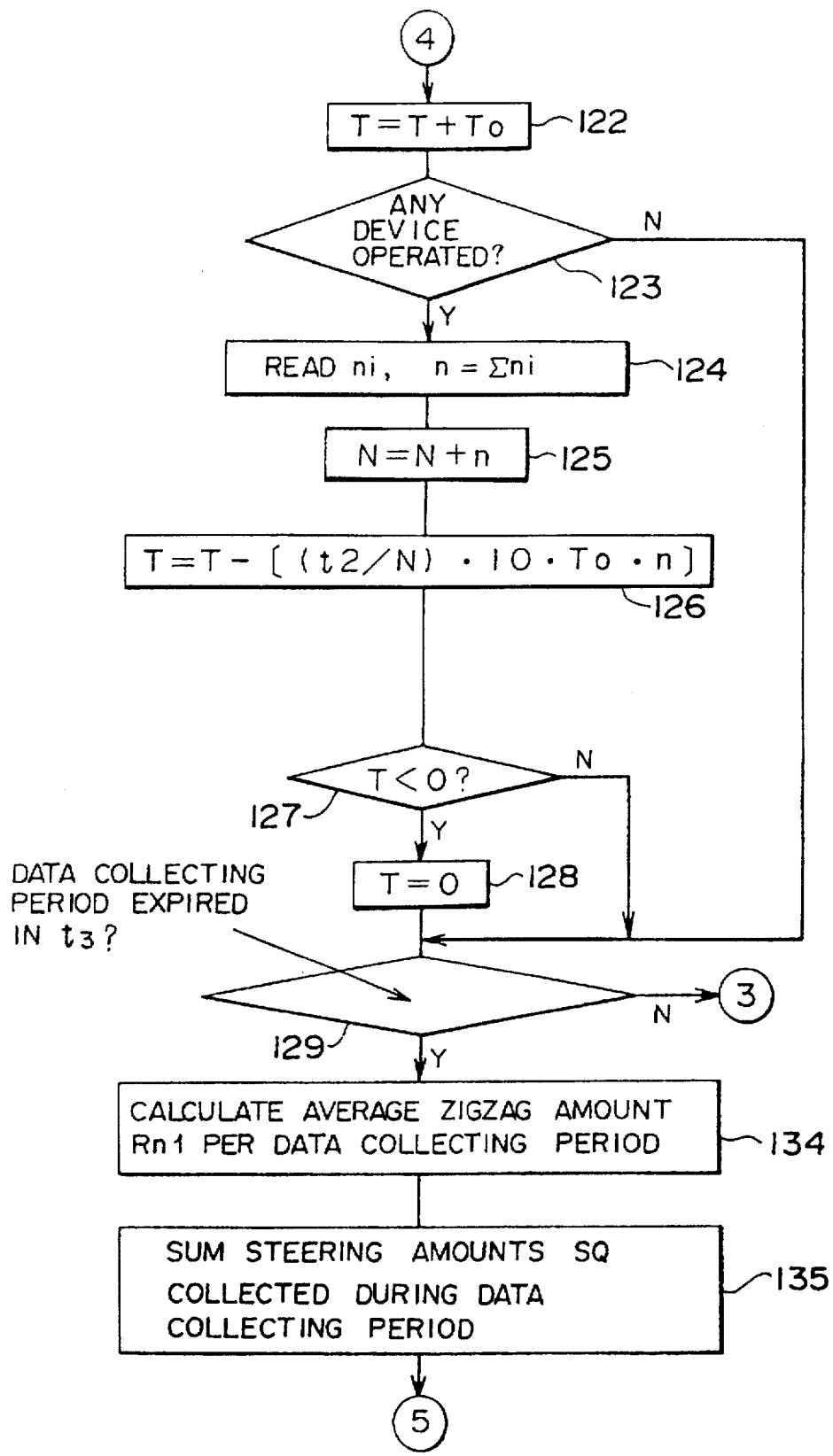
FIG. 11 is a continuation of the flowchart of FIG. 10.
Figure 12:
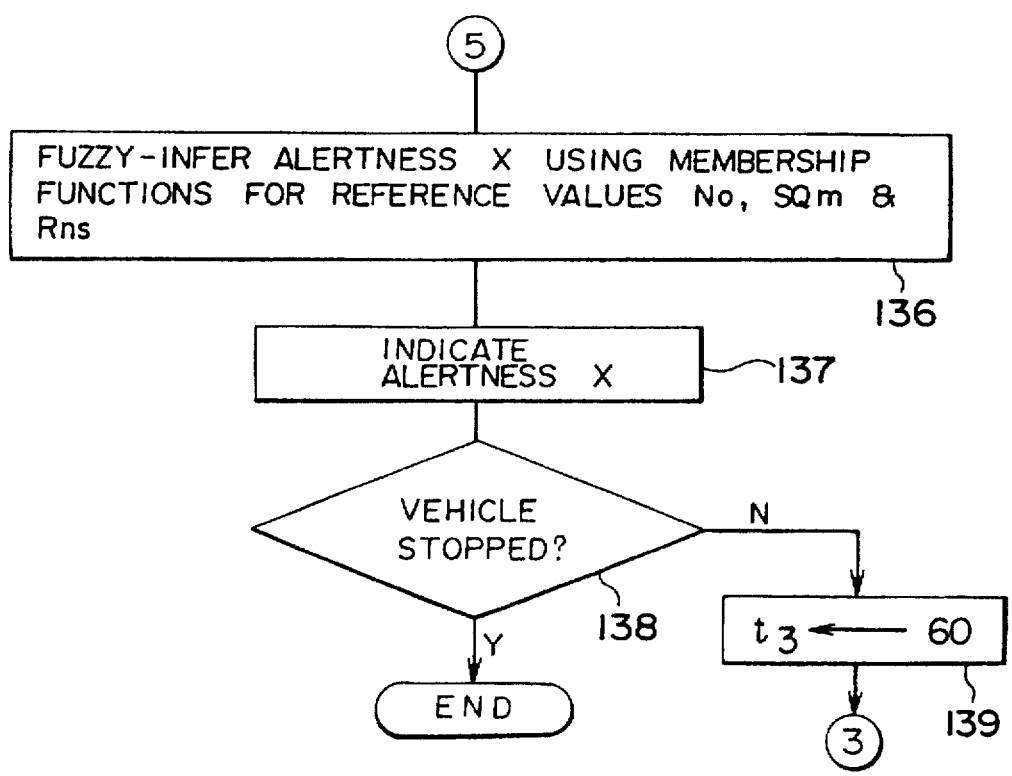
FIG. 12 is a continuation of the flowchart of FIG. 11.

Thereafter, the alertness determining period $t_3$ is forcibly set to 60 seconds (step 139) so long as the vehicle keeps running. Then, control logic is returned to step 116 (FIG. 10). Conversely, if the vehicle stops running, the safety driving system becomes inactive.

On the other hand, the alertness determined by the fuzzy inference is sequentially compared to preset values 4, 3, 2 and 1 which represent the alertness and have been stored in the memory 21 (steps 201 to 204).

The value 4 represents that the driver is substantially half asleep. The value 3 represents that the driver is dozing and occasionally zigzagging. The value 2 denotes that the driver frequently yawns and becomes very sleepy. The value 1 denotes that the driver becomes slightly sleepy.

If the alertness X is larger than the value 4 (affirmative in step 210), the wake-up member 7d becomes active for the predetermined length of time, and emits light beams, a blast, sound and vibrations in combination, or applies an electrical shock to the driver (step 205).

In the case that the alertness X is larger than the value 3 (affirmative in step 202), the wake-up member 7c becomes active for the predetermined length of time, and emits sound or vibrations to the driver (step 206).

If the alertness X is larger than the value 2 (affirmative in step 203), the wake-up member 7b becomes active and emits light beams or a blast to the driver (step 207).

Finally, if the alertness X is larger than the value 1 (affirmative in step 204), the wake-up member 7a becomes active and emits a scent or a breeze to the driver (step 208).

However, if the alertness X is smaller than the value 1 (negative in step 204), none of the wake-up members will be actuated.

The countermeasures are taken so as to alert the driver in accordance with the alertness X, thereby preventing driving while half asleep, and assuring safe and reliable driving.

In this embodiment, continuous variations of the driver's state are recognized as factors representing fatigue. The steering amount is recognized as a factor representing half-sleep driving. The zigzag amount is determined in terms of deviations of the white lines on the road surface in front of the vehicle. These factors are used as inputs for the fuzzy inference. Further, the driver's personal driving data are collected and stored during the initial period in which the driver is fully alert and is unlikely to be driving while half asleep. Therefore, the fact that the driver is driving while half asleep can be always detected reliably without any delay. Still further, the driver can be appropriately awakened in steps according to his or her alertness.

Various wake-up members may be usable other than those described above, such as vibrating the driver's seat.

Figure 23:
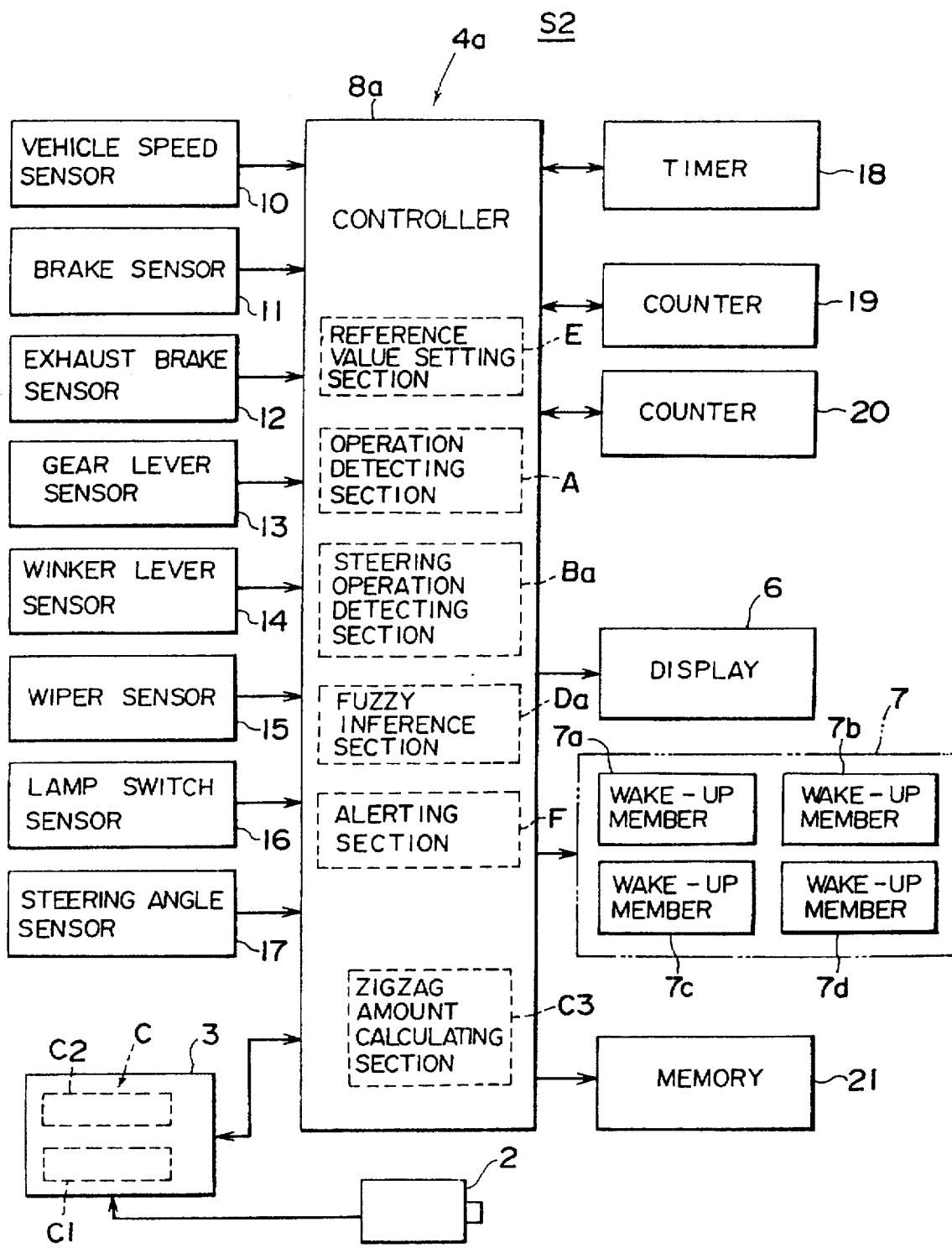
FIG. 23 is a schematic view showing the configuration of a safety driving system according to a second embodiment.
Figure 24:
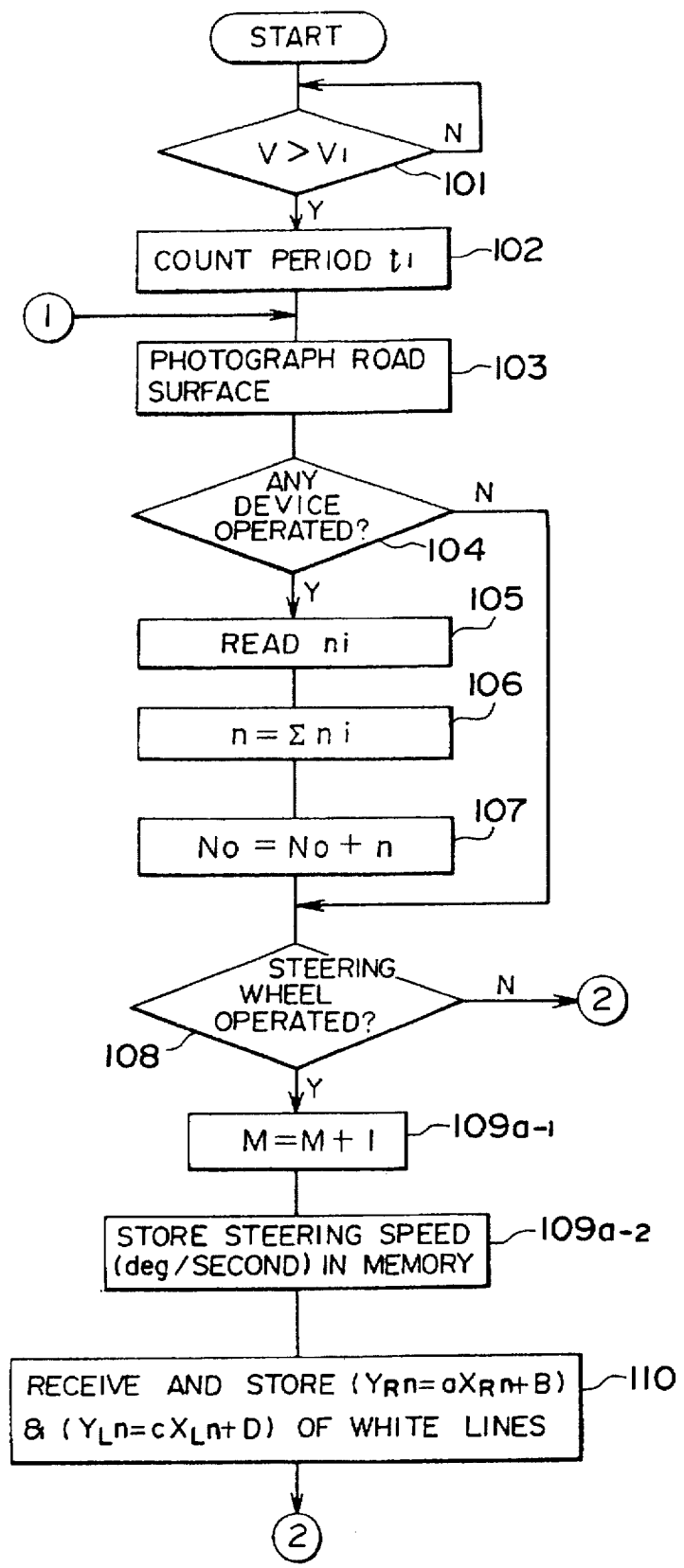
FIG. 24 is a flowchart showing a control operation of the safety driving system of FIG. 23.
Figure 25:
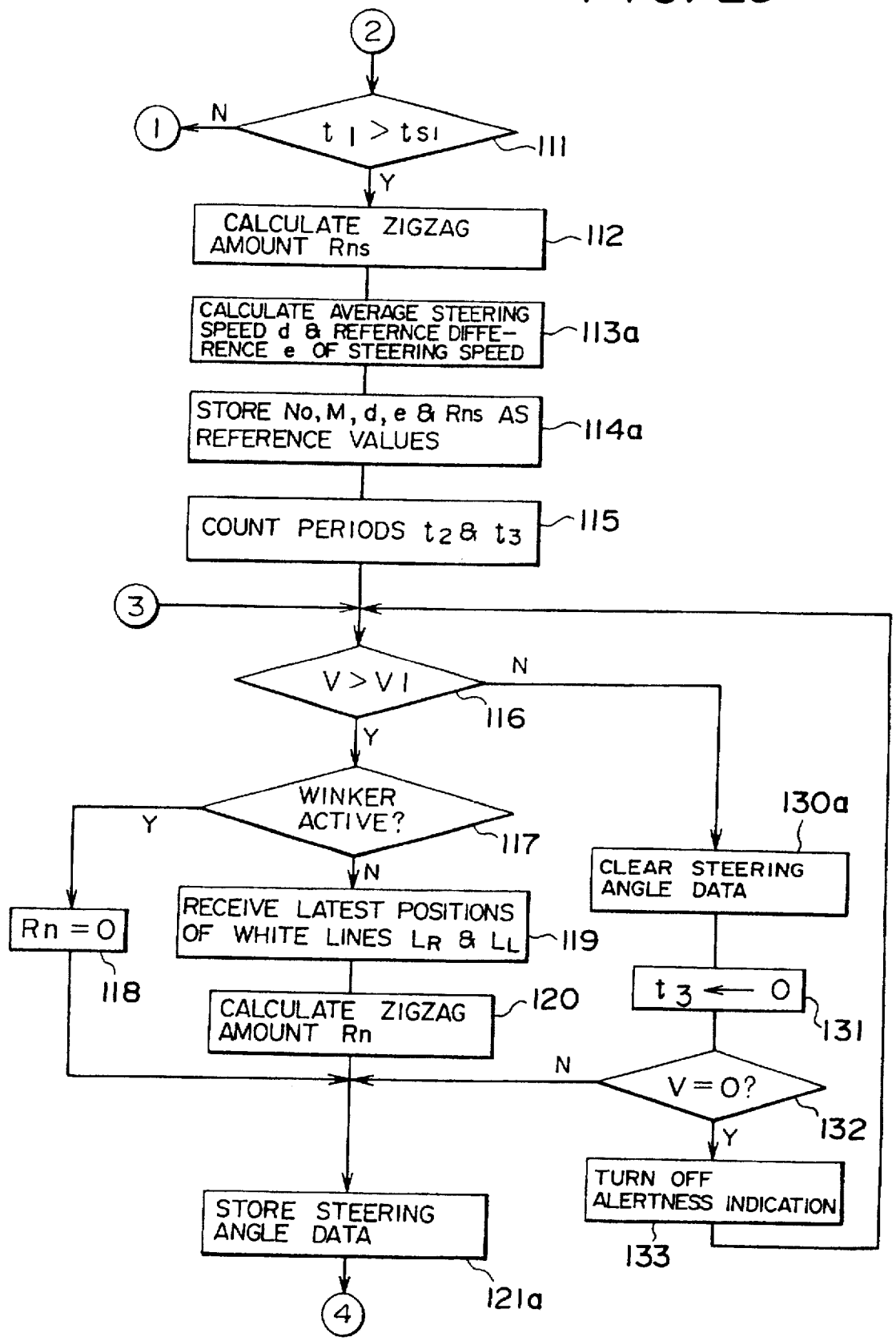
FIG. 25 is a continuation of FIG. 24.
Figure 26:
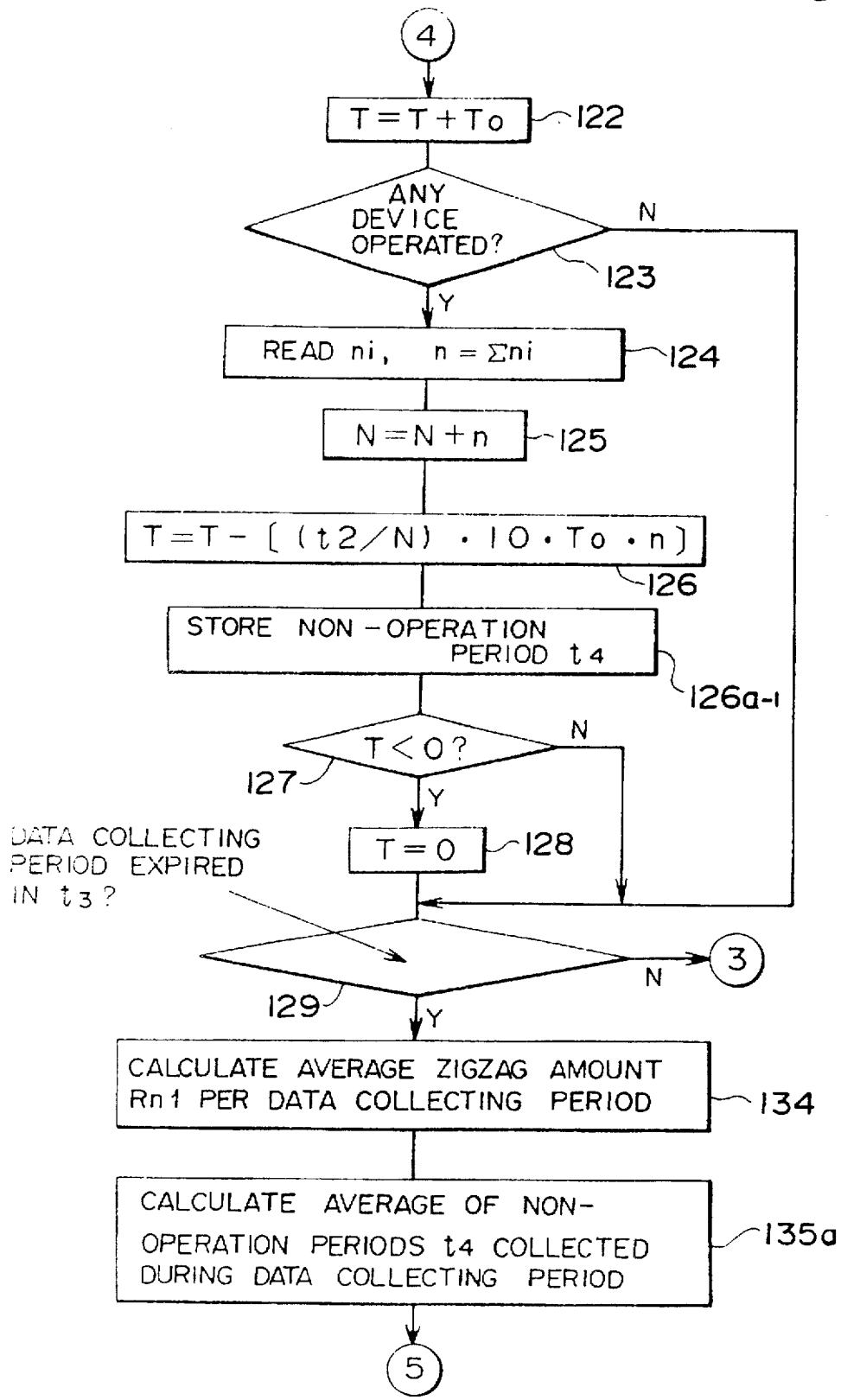
FIG. 26 is a continuation of FIG. 25.
Figure 27:
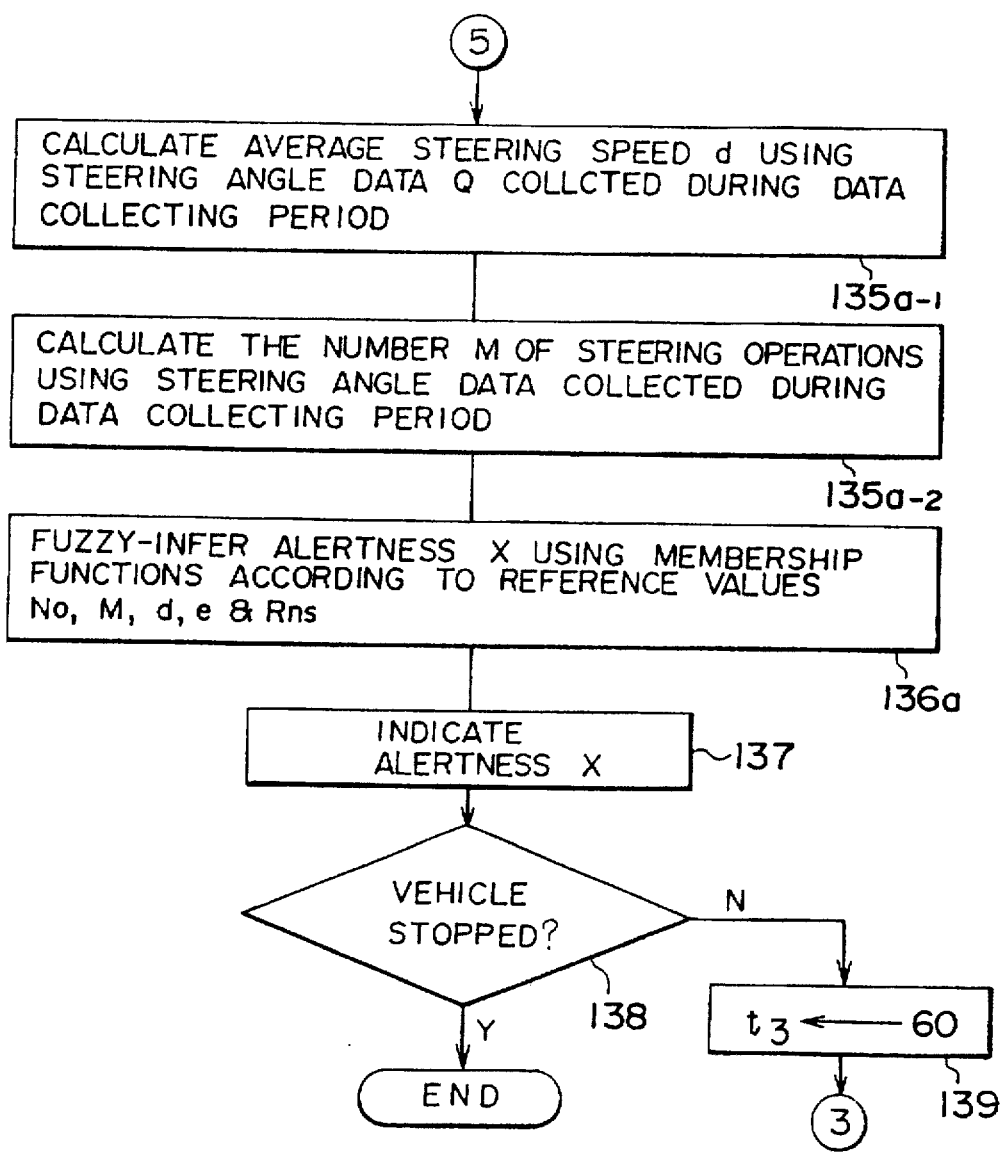
FIG. 27 is a continuation of FIG. 26.

FIG. 23 is a block diagram showing the configuration of a safety driving system S2 according to a second embodiment. The safety driving system S2 differs from the safety driving system S1 of FIG. 1 in the following respect. A steering operation detector Ba and a fuzzy inference section Da in a control unit 4a function in a manner different from those of the control unit 4 of the first embodiment. Hereinafter, identical parts have identical reference numbers to those of the first embodiment. The description will mainly focus on those points which are different.

The control unit 4a includes a controller 8a, to which various sensors are connected, similarly to the control unit 4 of the first embodiment. The running position detecting section C also serves as a zigzag amount calculator C3. The control unit 4a also includes the operation detecting section A, reference value setting section E, alerting section F, steering operation detector Ba, and fuzzy inference section Da for inferring the alertness of the driver, similarly to the control unit 4 of the first embodiment.

The reference value setting section Ea is active during a initial period of a given length $t_{s1}$ after the vehicle is actuated, and functions in steps (1) to (8).

(1) Sets the initial period after the vehicle is started.

(2) Reads a weight ni from the memory 21 each time at least one of the driver-operated devices, other than the steering wheel, is operated by the driver.

(3) Add the weights ni in the counter 19, and retains the sum n ($n=\Sigma ni$), and retains it as the total number No of operations during the initial period. The weights ni are added to cope with simultaneous operation of a plurality of devices, although such a situation is actually rare.

Figure 28:
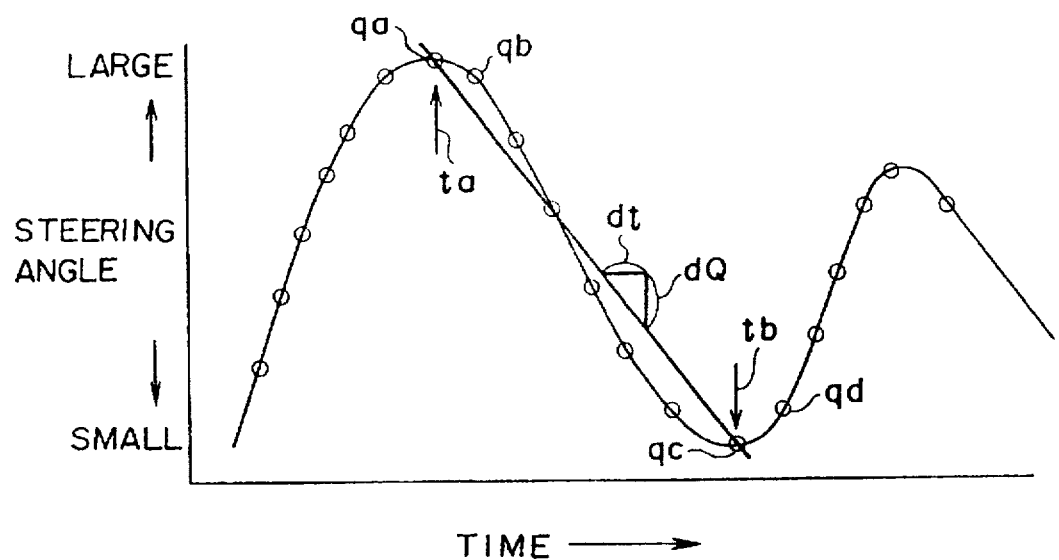
FIG. 28 is a characteristic curve showing a relationship between the number of steering operations and a steering speed.

(4) Stores, in the memory 14, the number M of steering operations per minute, which is obtained by increasing the count of the counter 19 by one for each steering period between points ta or tb in FIG. 28. The steering wheel is reversed at the point ta between points qa and qb, and is also reversed at the point tb between the points qc and qd. A sign (+ or −) of a difference between a previous steering angle Q and a current steering angle Q, which is detected by the steering angle sensor 17, is reversed at the points ta and tb (shown by circles in FIG. 28).

(5) Determines steering speeds (deg/second) on the basis of the steering angles Q detected by the steering angle sensor 17, and an inclination ($=dt/dQ$) of a straight line L connecting the points ta and tb which represent the start and end/start of two consecutive steering periods (FIG. 28), and stores the steering speeds in the memory 21.

(6) Calculates an average d of the steering speeds collected after the expiration of the initial period.

(7) Reads, from the memory 21, a tolerance e of the steering speed (i.e. which is derived using the upper and lower 40% of the detected steering speeds truncated).

(8) Stores, in the memory 21, the total number No of operations, the number M of steering operations, the average d of the steering speeds, and the tolerance e of the steering speed as reference values when the initial period expires.

The steering angle detecting section Ba becomes active after the expiration of the initial period, and functions in the following steps.

(1) Stores, in the memory 21, steering angle data detected by the steering angle sensor 17.

(2) Calculates an average d of steering speeds on the basis of data Q of the steering angles during the latest data collecting period (=one minute).

(3) Calculates the number M of steering operations per minute using the steering angle data collected in the latest minute.

The fuzzy inference section Da becomes active after the completion of the initial period, and infers the driver's alertness using membership functions for the monotonousness T from the operation detecting section A, the number M of steering operations and steering speeds from the steering operation detecting section Ba, and the zigzag amount Rn from the running position detecting section A.

The operation of the safety driving system S2 will be described with reference to flowcharts shown in FIGS. 24 to 27. Since these flowcharts are substantially similar to those shown in FIGS. 9 to 12 for the safety driving system S1 of the first embodiment, identical steps have identical reference numbers, and different steps are assigned with numbers having a suffix "a".

When the engine is actuated by the ignition key, the camera 2, image processor 3 and control unit 4a become active in the safety driving system S2. When a vehicle speed V exceeds the predetermined value V1, counting of the initial period $t_1$ is started. The control unit 4a provides a photographing command to the camera 2 and the image processor 3 (steps 101–103). The image processor 3 performs the operation sequence as shown in FIG. 13.

When the driver operates at least one of the driver-operated devices, other than the steering wheel, a weight ni assigned to the operated device is read, and is added to the count of the counter 19 as a sum n. The sum n is stored as the total number No of operations during the initial period (steps 104–107).

The steering angle sensor 17 detects a steering angle Q of the steering wheel. Each time the steering wheel is operated, the counter 20 is increased by "1", so the number M of steering operations is sequentially stored in the memory 21 (steps 108, 109$_{a-1}$, 109$_{a-2}$).

M=M+1

Concurrently, a steering speed (deg/second) per steering operation is derived on the basis of each detected steering angle, and is stored in the memory 21.

In step 110, during the initial period $t_1$, the positions ($Y_R n=aX_R n+b$) and ($Y_L n=cX_L n+d$) on the X and Y coordinates of the white lines $L_R$ and $L_L$ are sequentially received from the image processing unit 3, and are stored in the memory 21 (step 111).

The initial period $t_1$ expires when it exceeds the preset length $t_{s1}$ (e.g. 20 minutes).

On the other hand, in response to the photographing command, the image processor 3 infers white lines shown in FIG. 13 during the initial period, as described above, and calculates the zigzag amount Rns on the basis of the driver's personal data collected during the initial period (step 112).

In step s113a, the steering speeds stored in the memory 21 are read, and an average steering speed d is calculated. Thus, a tolerance e of the steering speed (i.e. which is derived using the upper and lower 40% of the detected speeds truncated) is calculated. The memory 21 stores the following as reference values: the total number No of operations during the initial period, the number M of steering operations during the initial period, the tolerance e of the steering speed, and the zigzag amount Rns during the initial period indicated by the counter 19 (step 114a).

During the initial period of length $t_{s1}$, the driver's personal driving data are collected as described above.

After the lapse of the initial period, the timer 18 starts to count the driving period $t_2$ and the alertness determining period $t_3$.

When the vehicle speed V exceeds the preset value V1, the controller 8a checks whether or not the winker is active. If the winker is active, the zigzag amount Rno is reset to 0. Then, control logic is advanced to step 121a.

Conversely, when the winker is inactive, the control unit 4 receives the latest positions on the X coordinates ($X_{Rn1}$, $X_{Ln1}$), ($X_{Ln1}$, $X_{Ln2}$) and ($X_{Rn3}$, $X_{Ln3}$) of the white lines ($Y_R n=aX_R n+b$) and ($Y_L n=cX_L n+d$), calculates the zigzag amount Rn denoting a difference between the previous and current positions of the white lines on the X and Y coordinates, and stores the zigzag amount Rn in the memory 21 (steps 116–120).

When the vehicle speed V is reduced below V1, the existing steering angle data are cleared in the memory 21. Simultaneously, the alertness determining period $t_3$ is reset to 0 (steps 130a and 131). Further, when the vehicle speed V is reduced to 0, the alertness indication is turned off (steps 132 and 133). However, the non-operation period $t_4$, the monotonousness T and the previous X coordinates of the white lines remain indicated.

In steps 121a and 122, the steering angle data Q detected by the steering angle sensor 17 (data qn shown in FIG. 28) are stored in the memory 21. The constant To is accumulated in the counter 19, thereby deriving the monotonousness T.

T=T+To

The accumulation of the constant To is repeated every one tenth of a second, i.e. the control cycle time.

When at least one of the driver-operated devices, other than the steering wheel, is operated, the weight ni assigned to the operated device is read and a sum n (n=Σni) is accumulated in the total number N of operations in the counter 19 (steps 123–125).

n=Σni
N=N+n

Next, an average non-operation period [=$t_2$/N] between operations of driver-operated devices after the initial period is calculated, and is multiplied by an increase of the monotonousness (=10·To) and the read weight n. Thus, a quantity of reduced monotonousness [=($t_2$/N)·10·To·n] is calculated. An amount of reduced monotonousness is subtracted from the accumulated count of the counter 19, thereby updating the monotonousness T (step 126).

T=T−[($t_2$/N)·10·To·n]

As can be seen from the experiment data in FIG. 14, the monotonousness T keeps increasing unless any driver-operated device, other than the steering wheel, is operated. Conversely, the monotonousness T is reduced each time at least one driver-operated device is operated.

The count of the non-operation period $t_4$ is updated and stored in the memory 21 each time some driver-operated device is actuated, and the counter 19 is reset (step 126$_{a-1}$).

When the monotonousness T becomes negative, it is reset to 0 (steps 127 and 128).

The monotonousness T, the steering angle data and the zigzag amount Rn are repeatedly calculated and stored until the data collecting period of the alertness determining period $t_3$ expires (step 129).

After the expiration of the data collecting period, an average Rn1 of the zigzag amounts Rn, which denotes deviations on the X coordinate of the white lines ($Y_R n=aX_R n+b$) and ($Y_L n=cX_L n+d$), is derived (steps 129 and 134).

Likewise, an average of the non-operation periods $t_4$ stored during the data collecting period is calculated. The average steering speed d is also calculated using the data on the steering angles Q stored during the data collecting period (step 135$_{a-1}$). Likewise, the number M of steering operations during the latest data collecting period is calculated using the data of the steering angles Q (step 135$_{a-2}$).

In step 136a, the fuzzy inference section Da infers the alertness X. First of all, the four membership functions are retrieved for the zigzag amount Rn, the monotonousness T, the average steering speed d, and the number M of steering operations.

These membership functions depend upon the reference values obtained during the initial period (i.e. the average zigzag amount Rns, the total number No of operations, the number M of steering operations, the average steering speed d, and the tolerance e of steering speed range), and the total number N of operations after the initial period. The break points A, B and C are calculated on the basis of relationships shown in Table 2.

TABLE 2

|  | A | B | C |
| --- | --- | --- | --- |
| Monotonousness | C × ⅓ | C × ⅔ | 40, Max. value or a × 12, whichever is the largest |
| No. of steering operations | f, (g − 2 × i), or (2 × g − h), whichever is the largest | g | (g + 2 × i) h |
| Steering speed | d − 0.75e | d − 0.25e | d + 0.25e |
| Zigzag amount | Rns | A × 1.5 | A × 2 |

(1) The membership function for the monotonousness is similar to that of the safety driving apparatus S1 shown in FIG. 1. An actual example is shown in FIG. 16.

Figure 29:
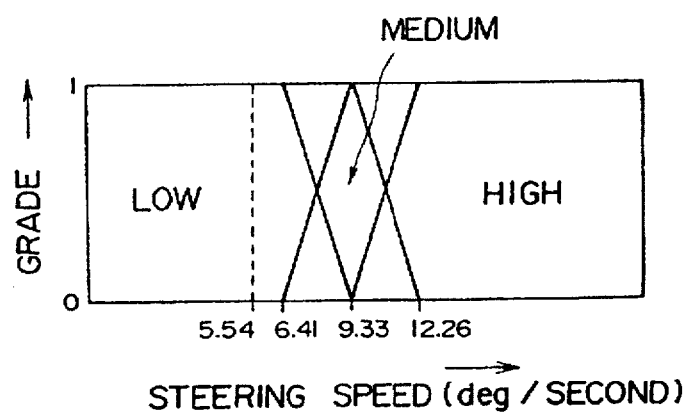
FIG. 29 shows a shape of the membership function with respect to the steering speed used by the safety driving system of FIG. 23.

(2) The membership function for the steering speed has three sections "high", "medium" and "low". The difference e is multiplied by 0.75. The break point A is derived by subtracting the foregoing multiplied value (=0.75e) from the average steering speed d (=d−0.75e). The break point B is derived by multiplying the difference e by a constant 0.25 and subtracting the multiplied value from the average d (=d−0.25e). The difference e is multiplied by the constant 0.25, and a resultant product is added to the average d (=d+0.25e), thereby deriving the break point C. These are shown in FIG. 29.

Figure 30:
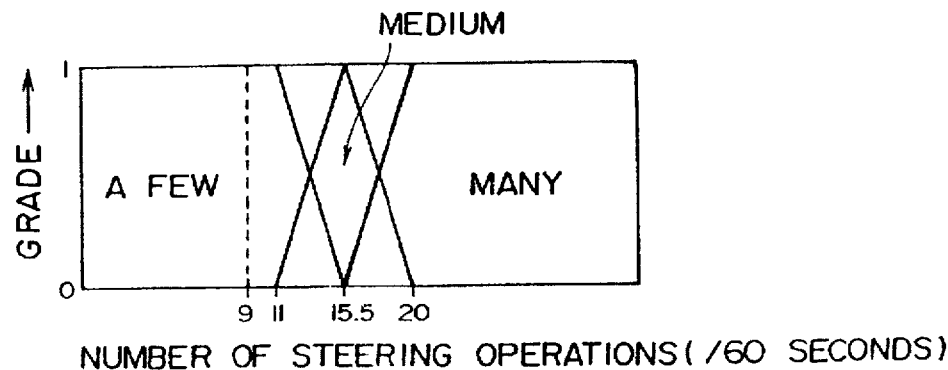
FIG. 30 shows a shape of the membership function with respect to the number of steering operations used by the safety driving system of FIG. 23.

(3) The membership function for the number of steering operations has three sections "many", "medium" and "a few". First of all, a minimum value "f", an average g, a maximum value "h", and a reference difference i of the number M of steering operations are derived. The break point A is "f", (g−2×i), or (2×g−h), whichever is the largest. The break point B is "g". Either (g+2×i) or "h", whichever is the smaller, is determined to be the break point C. Actual examples are shown in FIG. 30.

(4) The membership function for the zigzag amount is similar to that described with respect to the safety driving system S1. Actual examples are shown in FIG. 19.

The monotonousness, the number of steering operations and the steering speed are continuously updated each time their minimum and maximum values vary while the alertness determining process is being carried out after the break points of the membership functions have been determined. However, the zigzag amount remains unchanged after the reference value has been determined.

Fuzzy inference is executed using the foregoing membership functions so as to derive the alertness (step 136a), as described hereinafter.

Fuzzy converting grades of the monotonousness are calculated on the basis of a current monotonousness T (the current count of the counter 19) and the membership function shown in FIG. 17.

For instance, a monotonousness T 20.57 belongs to the sections "medium" and "low" shown in FIG. 17. Thus, two fuzzy converting grades 0.76 and 0.24 are derived.

One fuzzy converting grade for the steering speed is calculated using the average steering speed "d" per data collecting period (derived in step $135_{a-1}$) and the membership function shown in FIG. 29.

For example, an average steering speed of 5.54 deg/second belongs to the section "low", so the fuzzy converting grade 1.0 is derived.

The number N of steering operations per data collecting period (in step $135_{a-2}$) and the membership function shown in FIG. 30 are used to derive one fuzzy converting grade for the number of steering operations.

The number of steering operations of 0.9 per data collecting period belongs to the section "a few", so one fuzzy converting grade 1.0 is derived.

Two fuzzy converting grades for the zigzag amount are calculated using the average zigzag amount Rn1 (step 134) and the membership function shown in FIG. 19.

For example, a zigzag amount of 20.6 belongs to the two sections "medium" and "large", so the two fuzzy converting grades 0.95 and 0.05 are derived.

The memory 21 stores a control rule format shown in FIG. 31. The alertness, i.e. a necessary quantity, is derived by applying the foregoing fuzzy converting grades to the control rule.

Figure 32:
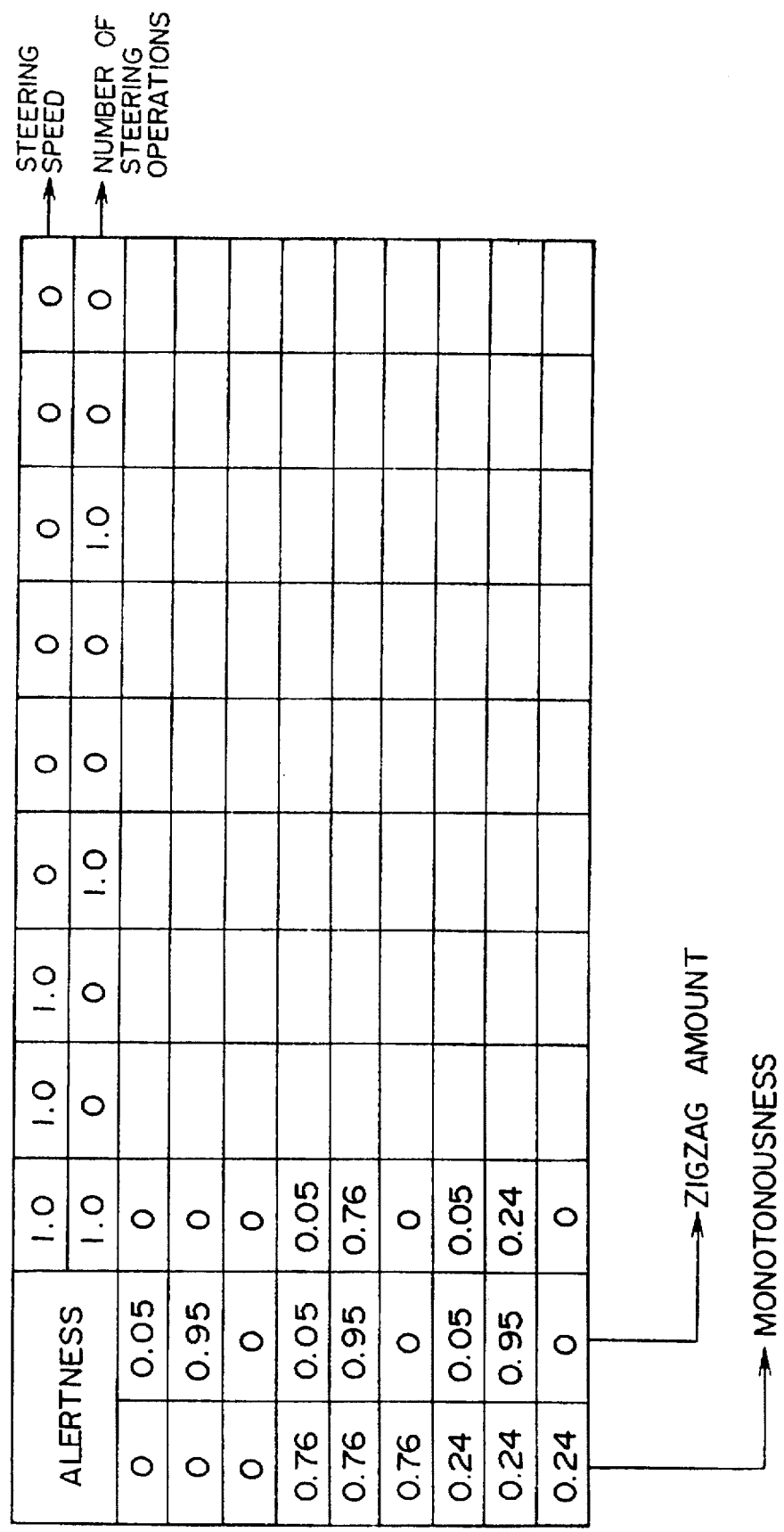
FIG. 32 shows a format of the control rule to which fuzzy conversion grades are applied.

In this case, four fuzzy converting grades underlined in FIG. 31 have been calculated, and are applied to values shown in FIG. 32.

The fuzzy converting grades of the monotonousness, steering speed, the number of steering operations and zigzag amount are not 0 in four sections 4, 3.5, 3 and 2.5.

A maximum value of the fuzzy converting grades in the section 4 is 0.05. A maximum value of the fuzzy converting grades in the section 3.5 is 0.76. Likewise, a maximum value in the section 3 is 0.05, and a maximum value in the section 2.5 is 0.24.

The alertness, i.e. a subsequent, is derived using a membership function, which has a triangular shape, nine sections and levels 1 to 5. The membership function is stored in the memory 21.

Figure 33:
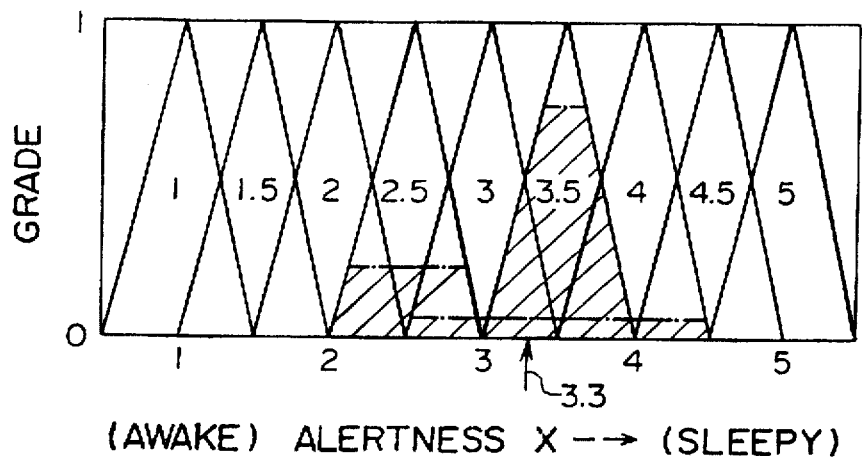
FIG. 33 shows a shape a membership function with respect to the driver's alertness, used by the safety driving system of FIG. 23.

The fuzzy converting grades derived for the respective sections are applied to the membership function for the alertness, as shown by shaded portions in FIG. 33. The center of gravity of the shaded portions is calculated so as to obtain the alertness (=3.3). Thus, the fuzzy inference is completed.

The obtained alertness X is indicated on the display 6 (step 137). Observing the display 6, the driver can ascertain his or her own driving state. Further, fellow passenger can speak to the driver, alert the driver and so on, thereby preventing the driver from driving while half asleep.

In this state, the alertness determining period $t_3$ is forcibly set to 60 seconds (step 139) unless the vehicle stops running. Control logic returns to step 116. Conversely, when the vehicle stops running, the safety driving system will become inactive.

Thereinafter, the alerting section F of the control unit 4a selectively actuates the wake-up member 7a, 7b, 7c or 7d depending upon the alertness X, similarly to the safety driving system S1 of the first embodiment. The wake-up unit alerts the driver depending upon the alertness X, thereby preventing driving while half asleep and improving the safety of the vehicle.

The safety driving system S2 of the second embodiment is as effective as the safety driving system S1 of the first embodiment. In the second embodiment, not only the characteristics of the steering operation (i.e. the number M of steering operations and the steering speed d) which are especially affected by the driver's alertness, but also the zigzag amounts are adopted as inputs for the fuzzy inference and as the reference values, so it is possible to recognize the driver's alertness and the monotonousness of driving precisely and continuously. This allows the safety driving system to enhance reliable and safe driving.

Figure 34:
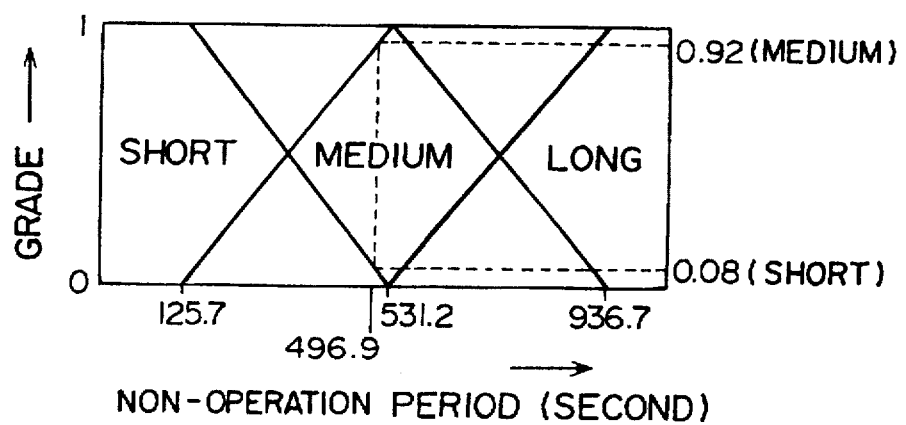
FIG. 34 shows a shape of a membership function with respect to a non-operation period, used in a modification of the safety driving system of FIG. 34.

In the second embodiment, the steering detecting section Ba uses the number M of steering operations and the steering speed d as the steering amount. Alternatively, one of the fuzzy converting grades may be determined on the basis of the non-operation period $t_4$ obtained in step $126_{a-1}$. In such a case, the fuzzy converting grade for the non-operation period is calculated using the membership function for the non-operation period $t_4$ shown in FIG. 34. The fuzzy converting grade for either the number M of steering operations or the steering speed d, and the fuzzy converting grades for the monotonousness or the zigzag amount are calculated. The calculated fuzzy converting grades will be processed as described above so as to infer the alertness X. This modified example is as effective as the safety driving system S2 of the second embodiment.

Figure 35:
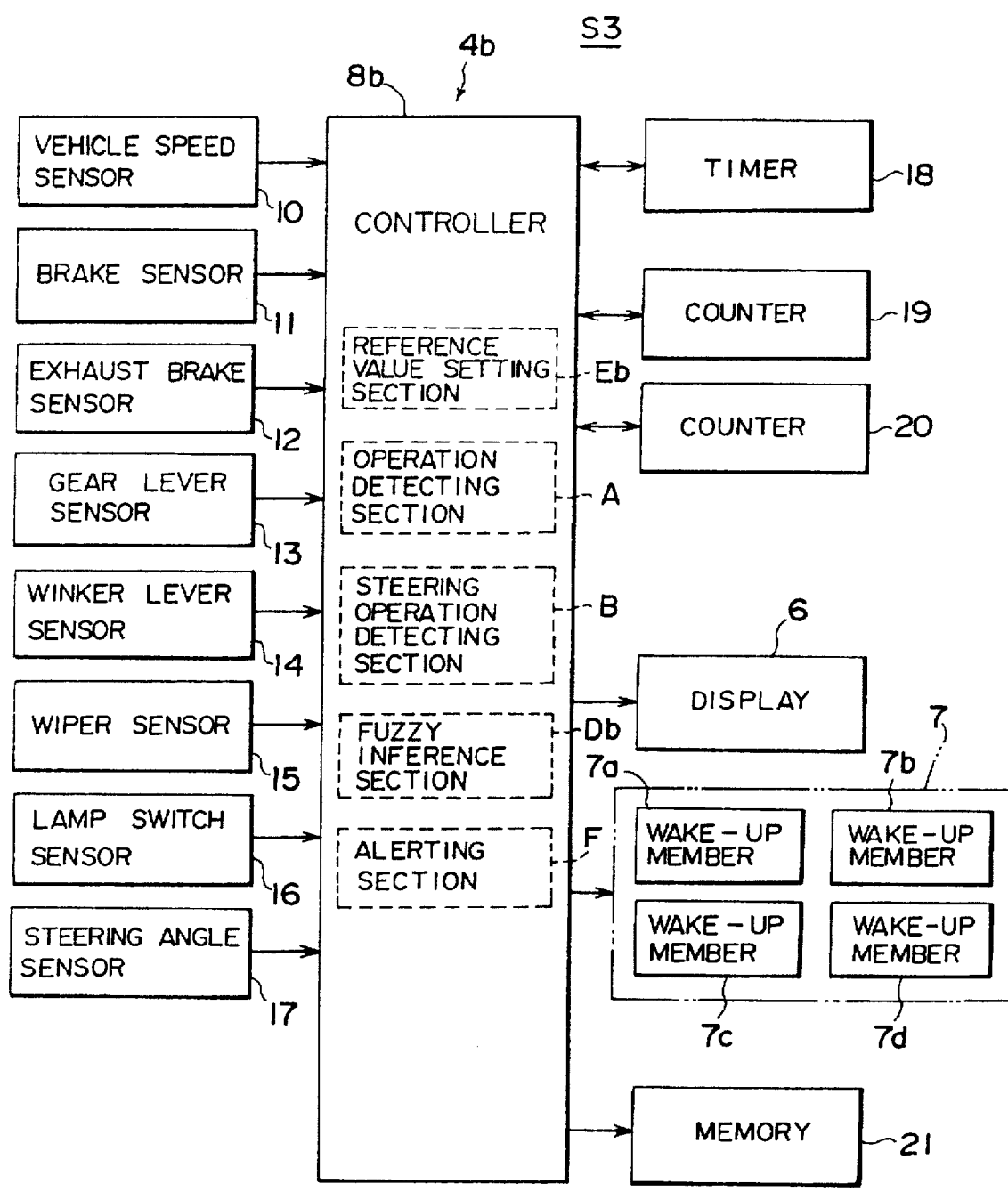
FIG. 35 is a schematic view showing the configuration of a safety driving system according to a third embodiment of the invention.

A safety driving system S3 according to a third embodiment is configured as shown in FIG. 35.

The safety driving system S3 differs from the safety driving system S1 of FIG. 1 in the following respect: absence of the camera 2 and the image processor 3 connected to the camera 2, and the zigzag amount calculating section C3 (in the control unit 4b); and the functions of the fuzzy inference section Db. Identical parts have identical reference numbers, and will not be described in detail here.

The control unit 4b is connected to a variety of sensors via its controller 8b so as to detect operations of various driver-operated devices. The control unit 4b also functions as the operation detecting section A, steering detecting section B and alerting section as described with respect to the control unit 4. These units will not be described here.

Further, the control unit 4b functions as a reference value setting unit Eb and the fuzzy inference section Db.

The reference value setting section Eb is active during the initial period of a given length $t_{s1}$, and functions in the following steps.

(1) Set the initial period after the vehicle is started;

(2) Read, from the memory 21, a weight ni each time at least one driver-operated device, other than the steering wheel, is operated;

(3) Add the read weights ni to the count of the counter 19, and retain a sum n (n=Σni) and stores it as the total number No of operations during the initial period. The weights ni are added so as to cope with simultaneous operations of a plurality of driver-operated devices, although this situation is actually not likely.

(4) store, in the memory 21, the total number No of operations and an average SQm of the steering amounts SQ as the reference values at the end of the initial period.

The fuzzy inference section Db becomes active after the expiration of the initial period, and functions to infer the driver's alertness using the membership functions for the monotonousness T from the operation detecting section A, and for the steering amount SQ from the steering operation sensor B.

The fuzzy inference section Db executes an alertness determination cycle every minute so as to infer the alertness. However, since the data used for a current determination cycle have been collected for ten minutes in a previous determination cycle, they are sequentially received with a one minute delay.

Figure 36:
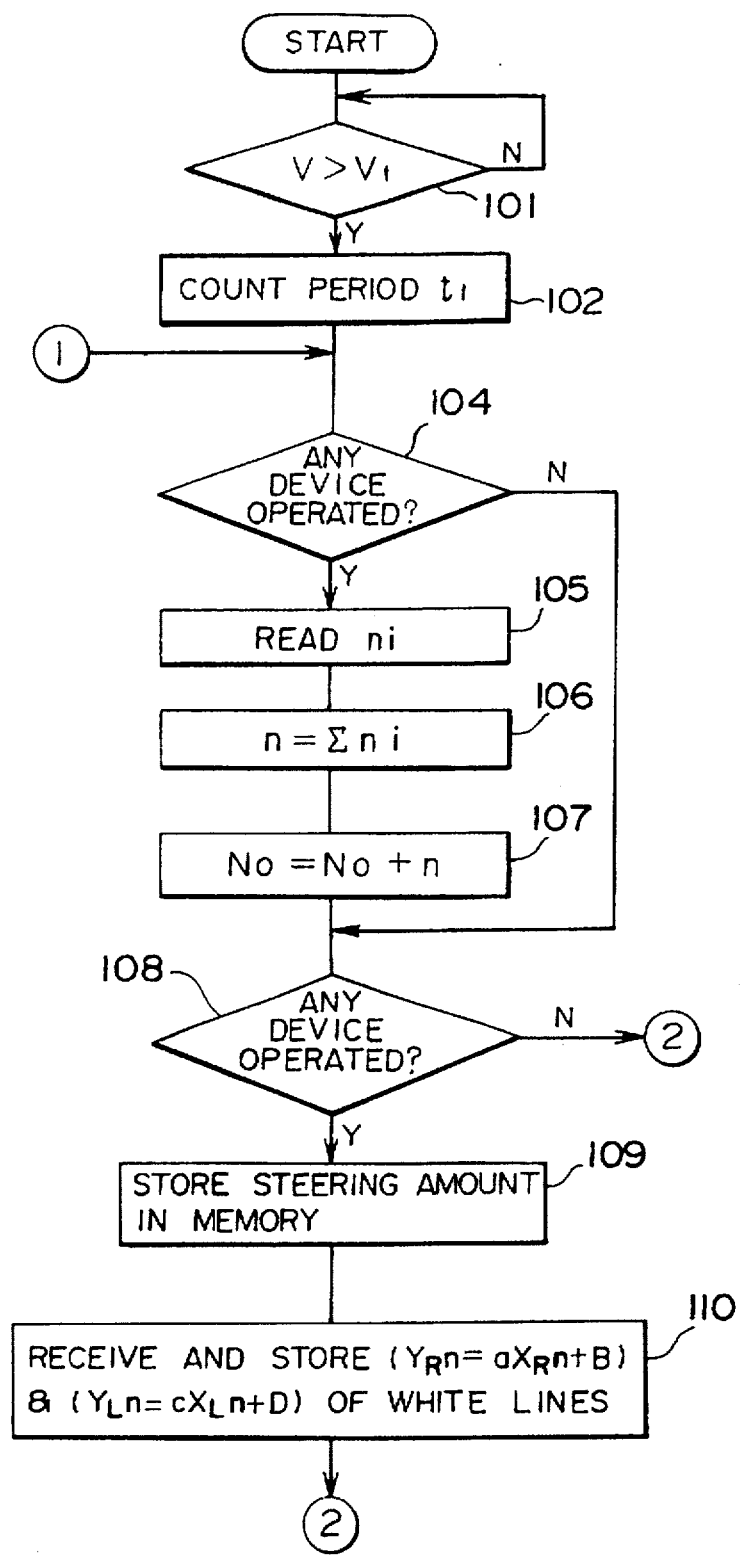
FIG. 36 is a flowchart of a control operation of the safety driving system of FIG. 35.
Figure 37:
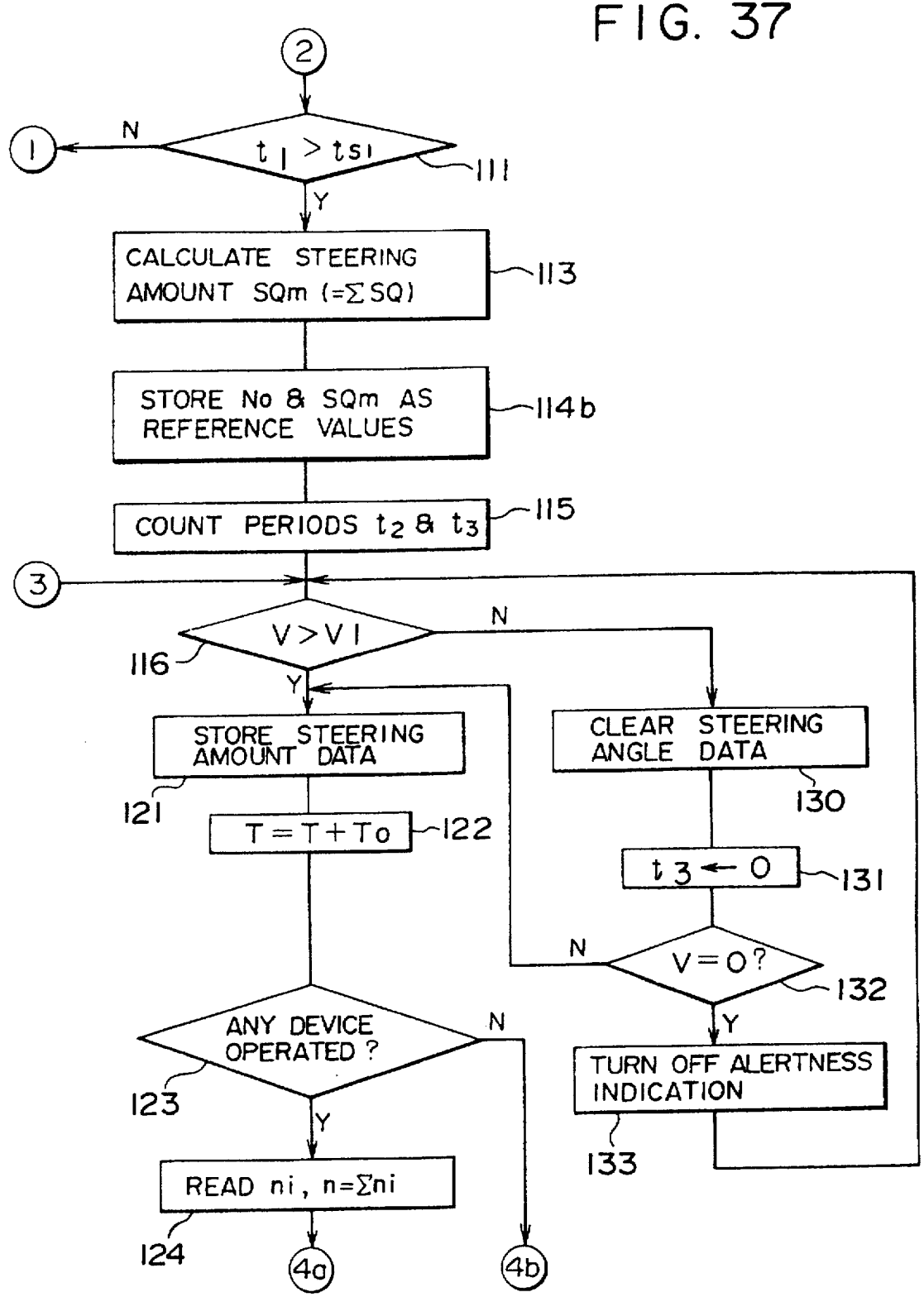
FIG. 37 is a continuation of FIG. 36.
Figure 38:
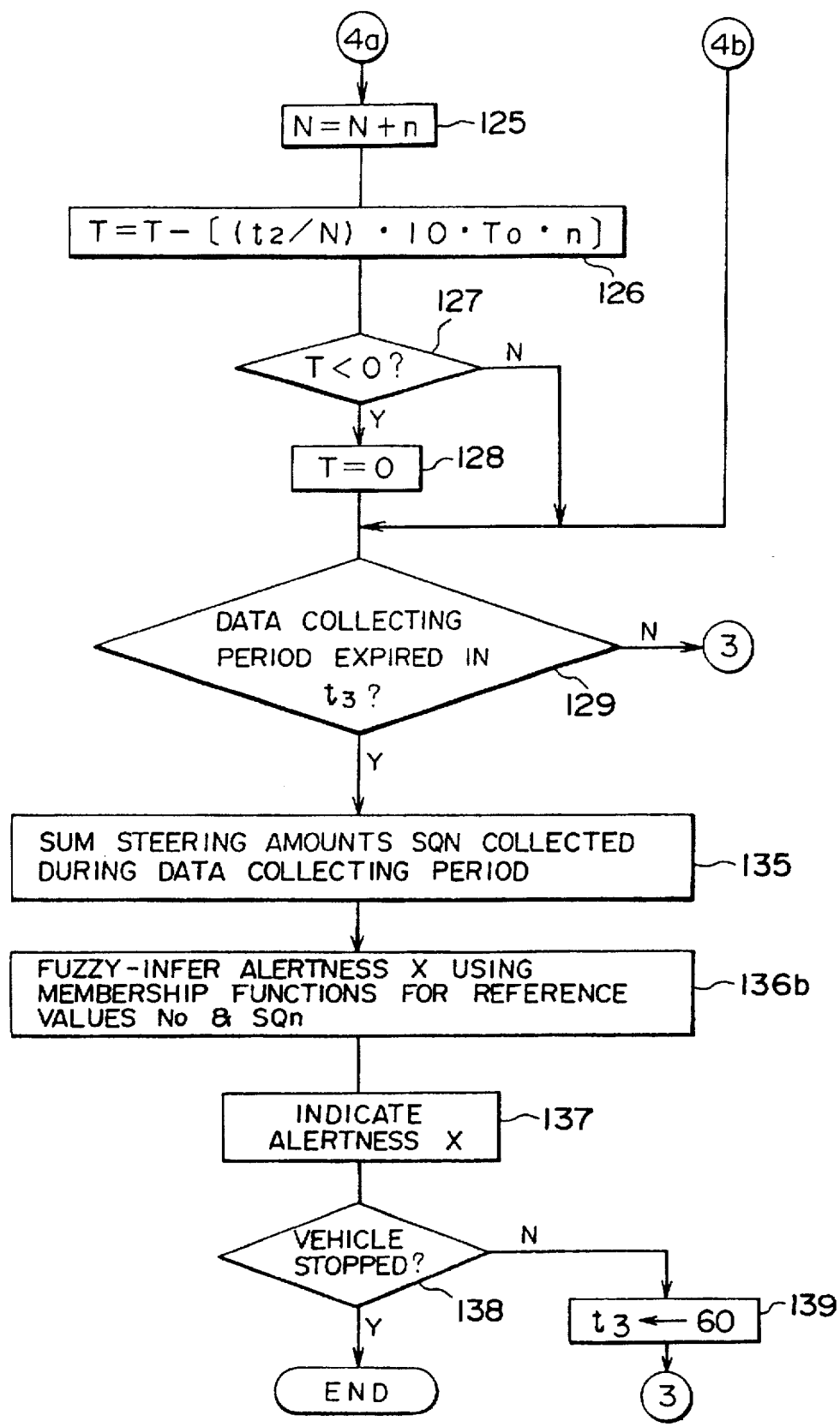
FIG. 38 is a continuation of FIG. 37.

The operation of the safety driving system S3 will be described with reference to a flowchart shown in FIGS. 36 to 38. This flowchart is substantially similar to the flowchart shown in FIGS. 9 to 12 with respect to the safety driving system S1 of the first embodiment. Identical steps have identical reference numbers, and are not described here. However, the reference numbers of different steps are suffixed with a letter "b".

Following the actuation of the engine by the ignition switch, the control unit 4b becomes active. After a detected vehicle speed V exceeds the predetermined value V1, counting of the initial period $t_1$, will be initiated (steps 101 and 102).

Each time one of the driver-operated devices, other than the steering wheel, is operated, a weight ni assigned to the operated device is read, and is added to the count of the counter 19 as a sum n. The sum n is retained as the total number No of operations during the initial period (steps 104 to 107).

Each time the steering wheel is operated, the count of the counter 20 is increased by one, and is stored in the memory 21 as the number M of steering operations (steps 108 and 109).

M=M+1

The initial period $t_1$, completes when it exceeds the predetermined period $t_{s1}$ (e.g. 20 minutes) (step 111).

When control logic is advanced to step s113, the steering amount SQ is derived using the steering angle data Q stored in the memory 21 and formula (2). Then, the steering amount SQ is read so as to calculate steering amounts SQm during the initial period.

The memory 21 stores, as reference values, the total number No of operations during the initial period and the reference steering amount SQm (step 114b).

On completion of the initial period, the timer 18 starts counting the driving period $t_2$ and the alertness determining period $t_3$ in step 115.

When the vehicle speed V is reduced below the preset value V1, the existing steering amount data are cleared in the memory 21 (steps 130 and 131).

The indication of the alertness is turned off when the vehicle speed V becomes zero (steps 132 and 133). However, the monotonousness T remains indicated on the display.

In step 121, the steering amount SQ is derived using formula (2) and the steering angle Q data, and is stored in the memory 21.

The counter 19 accumulates the constant To, thereby deriving the monotonousness T (step 122).

T=T+To

The constant To is accumulated every one tenth of a second, i.e. every control cycle.

When one of driver-operated devices, other than the steering wheel, is operated (affirmative in step 123), the weight ni assigned to the operated device is read from the memory 21, and is added to the count of the counter 19 as the sum n (step 125).

n=Σni

N=N+n

The driving period $t_2$ is divided into the total number N of operations so as to derive an average non-operation period [=$t_2$/N] after the expiration of the initial period.

The average non-operation period ($t_2$/N) is multiplied by the increase of the monotonousness per second (=10·To), a product of which is multiplied by the sum n as the weight ni, so the monotonousness reduced by the current operation [=($t_2$/N)·10·To·] is derived (step 126).

The reduced monotonousness is deducted from the value accumulated in the counter 19, thereby updating the monotonousness.

$T=T-[(t_2/N)\cdot 10\cdot To\cdot]$

As can be seen from FIG. 14, the monotonousness is continuously increased so long as no devices other than the steering wheel are operated. Conversely, the monotonousness is reduced each time some device is operated.

Referring to the experimental data in FIG. 14, the monotonousness T keeps increasing unless any driver-operated device, other than the steering wheel, is operated. Conversely, the monotonousness T is reduced each time at least one driver-operated device is operated.

When the monotonousness T becomes negative (affirmative in steps 127), it is reset to 0 (step 128).

The monotonousness T, the steering angle data and the zigzag amount Rn are repeatedly calculated and stored until the data collecting period expires (step 129).

When the data collecting period expires (affirmative in step 129), steering amounts collected during the data collecting period are added in accordance with data Qn on the steering angles stored during the same data collecting period. Thus, added SQn (=ΣQn) is stored in the memory 21 (step 135).

The alertness X is inferred in step 136b. First of all, the membership functions are called for the monotonousness T and the steering amount SQ.

Referring to FIG. 15, these membership functions have triangular shapes and three sections, as the antecedent, with break points A, B and C. Specifically, the membership functions depend upon the reference values obtained during the initial period (i.e. the monotonousness T, the steering amount SQm, and the total number No of operations), and the total number N of operations in the data collecting period.

The break points A, B and C are calculated on the basis of relationships as shown in Table 3.

TABLE 3

|  | A | B | C |
| --- | --- | --- | --- |
| Monotonousness | C × 3 | C × ⅔ | 40, Max. value or a × 12, whichever is the largest |
| Steering amount | Min. or Max. × 0.6, whichever is the larger | (A + C)/2 | Max. value |

(1) The membership function for the monotonousness is similar to that for the safety driving system S1 shown in FIG. 1. An actual example is shown in FIG. 17.

(2) The membership function for the steering amount is similar to that for the safety driving system S1 shown in FIG. 1. An actual example is shown in FIG. 18.

During determination of the alertness, the monotonousness and the steering amount are updated each time their minimum and maximum values vary, while the zigzag amount is not updated once its reference value is determined.

Fuzzy inference is executed using the foregoing membership functions.

Fuzzy conversion grades of the monotonousness are calculated using a current monotonousness T (count of the counter 19) and the membership function shown in FIG. 17.

For example, when the current monotonousness T is 20.57 and belongs to the sections "medium" and "low", two fuzzy conversion grades, 0.76 and 0.24, are derived.

Fuzzy conversion grades of the steering amount are calculated using the steering amount SQn per data collecting period (derived in step 135), and the membership function shown in FIG. 18.

For instance, when the average steering amount is 6452 and belongs to the sections "large" and "medium", two fuzzy conversion grades 0.86 and 0.14 are derived.

The memory 21 stores a format of a control rule shown in FIG. 39. The alertness, i.e. a quantity to be determined, is derived by applying the foregoing fuzzy conversion grades to the control rule.

In this case, two fuzzy conversion grades (shown in FIG. 40) are calculated, and are applied to the underlined values shown in FIG. 39.

There are four sections 3, 2.5, 1.5 and 1 where the fuzzy conversion grades are not 0 with respect to the monotonousness and the steering amount.

The fuzzy conversion grade corresponding to the sections 3 and 2.5 is 0.14. The fuzzy conversion grade corresponding to section 1.5 is 0.76.

A maximum value of the fuzzy conversion grades for the section 1 is 0.24.

Figure 41:
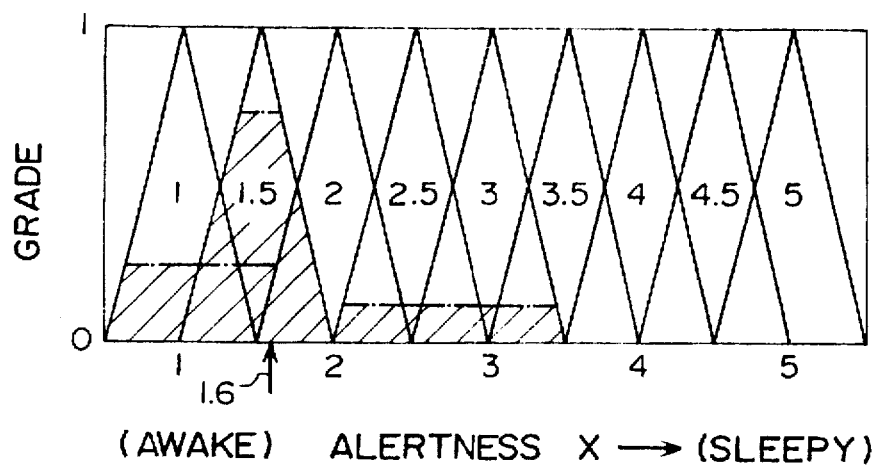
FIG. 41 is a graph showing a membership function with respect to driver's alertness, used by the safety driving system of FIG. 35.
Figure 42:
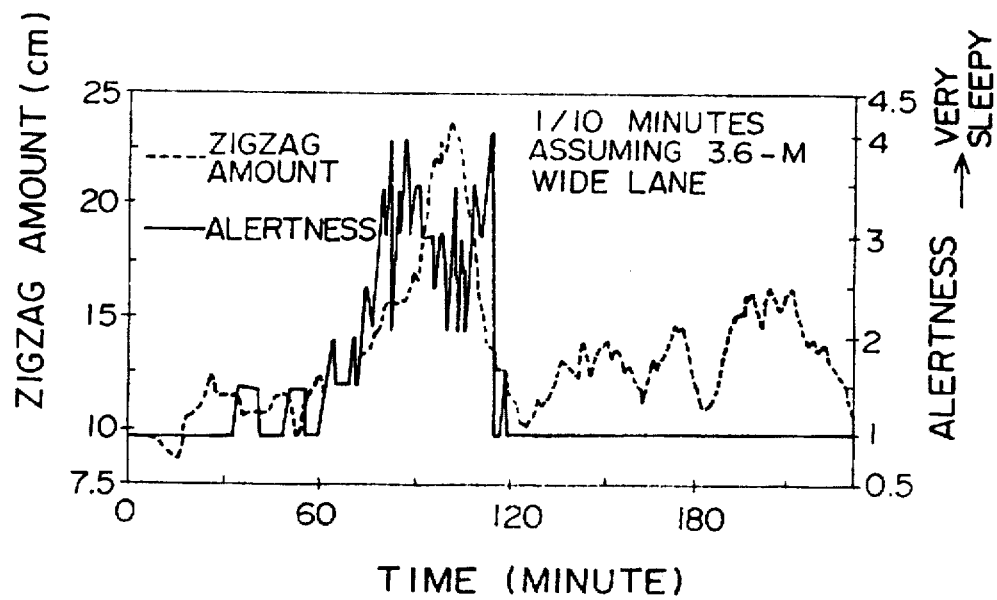
FIG. 42 is a graph showing the relationship between a zigzag amount of the vehicle and the driver's alertness.

Referring to FIG. 41, a membership function for the alertness, i.e. a subsequent, has a triangular shape, nine sections and alertness levels 1 to 5. The membership function is stored in the memory 21.

The fuzzy conversion grades are applied to the membership function for the alertness as shown by shaded portions in FIG. 41. The center of gravity of the shaded portions is calculated, thereby obtaining the alertness X (=1.6). Thus, the fuzzy inference is completed. Thereafter, the alertness X is indicated on the display 6 (step 137). Observing the display 6, the driver can ascertain his or her driving state. Further, a fellow passenger can take appropriate measures, e.g. speaking to or alerting the driver, thereby preventing the driver from driving while half asleep.

Thereafter, the alertness determining period $t_3$ is forcibly set to 60 seconds (step 139) so long as the vehicle keeps running. Then, control logic is returned to step 116. Conversely, if the vehicle stops running, the safety driving system becomes inactive.

Figure 22:
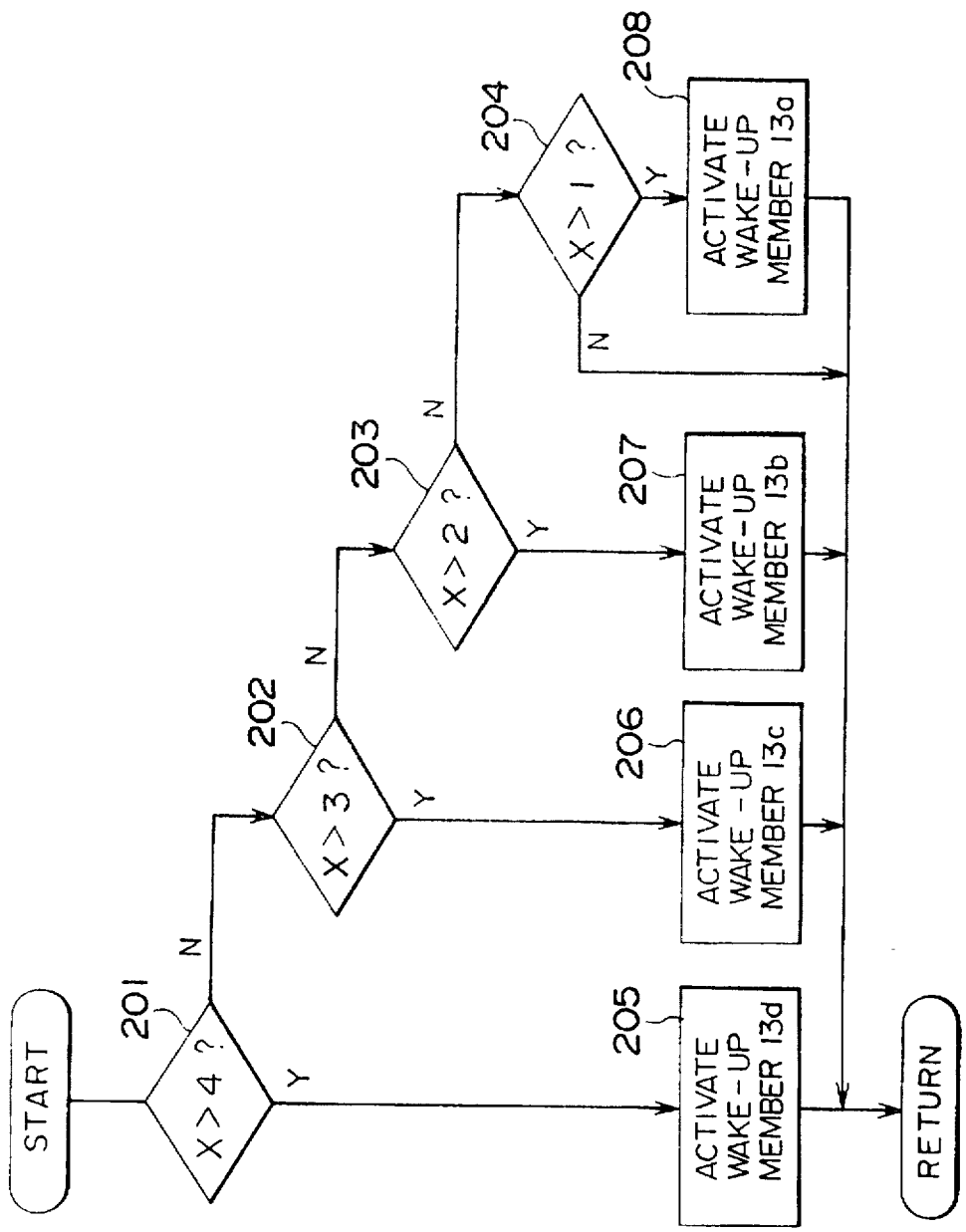
FIG. 22 is a flowchart showing how the safety driving system operates a wake-up unit.

In the safety driving system S3 similarly to the safety driving system S1, the alerting section F of the control unit 4b selectively activates the wake-up member 7a, 7b, 7c or 7d in accordance with the driver's alertness X as shown in the flowchart in FIG. 22, thereby alerting the driver, preventing the driver from driving while half asleep, and enhancing safe driving.

The safety driving system S3 of the third embodiment can alert the drive depending upon the driver's alertness, and is as effective as the safety driving system S1 of the first embodiment. Further, the safety driving system S3 can continuously detect the driver's alertness reliably, has a simplified structure because of the absence of devices such as the camera 2 and the image processing unit 3, and can be manufactured at a reduced cost.

The safety driving system according to the invention is applicable to a variety of motor vehicles, and is effective in alerting the driver depending upon the driver's alertness so as to assure safe driving.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A safety driving system comprising:
    an operation detecting section including accumulating means accumulating at each first predetermined cycle a constant during the operation of a vehicle and deriving monotonousness and subtracting means for subtracting a weight assigned to an operated device, except for a steering wheel, from a sum of accumulated constants and updating the monotonousness;
    a steering detecting section detecting an amount of steering operation within a preset period of time;
    a running position detecting section including: an image data memory selectively receiving and storing images of a road surface in front of a vehicle which are photographed at each second predetermined cycle by a camera supported on a vehicle body; image processing means extracting data on white lines of the road surface and determining coordinates of white lines defining a lane; a zigzag amount calculating section receiving coordinate data of the white lines and calculating a zigzag amount which denotes a deviation of the white lines on horizontal coordinates at each second predetermined cycle; and zigzag amount averaging section averaging the zigzag amount data calculated at a predetermined number of times;

a fuzzy inference section inferring a driver's alertness on the basis of membership functions respectively corresponding to the updated monotonousness, the amount of steering operation, and the average zigzag amount; and an alerting section activating wake-up members depending upon the driver's alertness.

2. The safety driving system as in claim 1, wherein the steering detecting section detects steering amounts of the steering wheel as the status data on the steering wheel within the present period of time.

3. The safety driving system as in claim 1, wherein the steering detecting section includes at least either a steering speed sensor for calculating an average steering speed of the steering wheel as the status data of the steering wheel within the preset period of time, or a steering sensor detecting the number of steering operations within the preset period of time.

4. The safety driving system as in claim 1, wherein the zigzag amount calculating section nullifies zigzag amounts collected while a winker signal is present.

5. The safety driving system as in claim 1, wherein the fuzzy inference section infers the driver's alertness using an average zigzag amount during an initial period immediately after actuation of the vehicle, as a reference value of the membership function for the running position detecting section.

6. The safety driving system comprising:

an operation detecting section including accumulating means for accumulating at each of a predetermined cycle a constant during the operation of a vehicle and deriving monotonousness and subtracting means subtracting a weight assigned to an operated device, except for a steering wheel, from a sum of accumulated constants and updating the monotonousness;

a steering operation detecting section detecting an amount of steering operation within a preset period of time;

a fuzzy inference section inferring a driver's alertness on the basis of membership functions respectively corresponding to the updated monotonousness and the amount of steering operation; and an alerting section activating wake-up members depending upon the driver's alertness.

7. The safety driving system as in claim 1, wherein the alerting section classifies the driver's alertness into one of four levels, includes a plurality of wake-up members emitting various alarms in accordance with the driver's alertness, and activates one of the wake-up members depending upon the driver's alertness.

8. The safety driving system as in claim 6, wherein the alerting section classifies the driver's alertness into one of four levels, includes a plurality of wake-up members emitting various alarms in accordance with the driver's alertness, and activates one of the wake-up members depending upon the driver's alertness.

* * * * *